INVENTORS
P. G. Brundell
K-E. A. Jonsson
BY Glascock Downing & Seebold
ATTYS.

INVENTORS
P. G. Brundell
K-E. A Jonsson
BY Glascock Downing & Seebold
ATTYS.

INVENTORS
P. G. Brundell
K-E. A. Jonsson
BY
Glascock Downing & Seebold
ATTYS.

Sept. 8, 1959 P. G. BRUNDELL ET AL 2,903,028

SWINGABLE DEBARKING TOOLS AND MOUNTING MEANS FOR SUCH TOOLS OF A ROTARY-RING-TYPE DEBARKER

Filed Aug. 18, 1958 18 Sheets-Sheet 4

INVENTORS
P. G. Brundell
K. E. A. Jonsson
BY Glascock Downing & Seebold
ATTYS.

Sept. 8, 1959 P. G. BRUNDELL ET AL 2,903,028

SWINGABLE DEBARKING TOOLS AND MOUNTING MEANS FOR SUCH TOOLS OF A ROTARY-RING-TYPE DEBARKER

Filed Aug. 18, 1958 18 Sheets-Sheet 5

INVENTORS
P. G. Brundell
K-E. A. Jonsson
BY Glascock Downing & Seebold,
ATTYS.

INVENTORS
P. G. Brundell
K-E. A. Jonsson
BY Glascock Downing & Seebold
ATTYS.

Sept. 8, 1959 P. G. BRUNDELL ET AL 2,903,028

SWINGABLE DEBARKING TOOLS AND MOUNTING MEANS FOR SUCH TOOLS OF A ROTARY-RING-TYPE DEBARKER

Filed Aug. 18, 1958 18 Sheets-Sheet 7

INVENTORS
P. G. Brundell
K-E. A. Jonsson
BY
Glascock Downing & Seebold
ATTYS.

INVENTORS
P. G. Brundell
K-E. A. Jonsson
BY
Glascock Downing & Seebold
ATTYS.

INVENTORS
P. G. Brundell
K-E. A. Jonsson
BY
Glascock Downing & Seebold
ATTYS.

INVENTORS
P. G. Brundell
K-E. A. Jonsson
BY
Glascock Downing Seebold
ATTYS.

Sept. 8, 1959 P. G. BRUNDELL ET AL 2,903,028

SWINGABLE DEBARKING TOOLS AND MOUNTING MEANS FOR SUCH TOOLS OF A ROTARY-RING-TYPE DEBARKER

Filed Aug. 18, 1958 18 Sheets-Sheet 11

INVENTORS
P. G. Brundell
K-E. A. Jonsson
BY Glascock Downing & Seebold,
ATTYS.

INVENTORS
P. G. Brundell
K-E. A. Jonsson
BY
Glascock Downing & Seebold
ATTYS.

INVENTORS
P.G. Brundell
K-E.A. Jonsson
BY
Glascock Downing Seebold
ATTYS.

INVENTORS
P. G. Brundell
K-E. A. Jonsson
BY
Glascock Downing & Seebold
ATTYS.

INVENTORS
P. G. Brundell
K-E. A. Jonsson
BY Glascock Downing & Seebold
ATTYS.

Sept. 8, 1959 P. G. BRUNDELL ET AL 2,903,028

SWINGABLE DEBARKING TOOLS AND MOUNTING MEANS FOR SUCH TOOLS OF A ROTARY-RING-TYPE DEBARKER

Filed Aug. 18, 1958 18 Sheets-Sheet 16

INVENTORS
P. G. Brundell
K-E. A. Jonsson
BY Glascock Downing & Seebold
ATTYS.

INVENTORS
P. G. Brundell
K-E. A. Jansson
BY Glascock Downing & Seebold
ATTYS.

INVENTORS
P. G. Brundell
K-E.A. Jonsson
BY Glascock Downing & Seebold
ATTYS.

United States Patent Office 2,903,028

Patented Sept. 8, 1959

2,903,028

SWINGABLE DEBARKING TOOLS AND MOUNTING MEANS FOR SUCH TOOLS OF A ROTARY-RING-TYPE DEBARKER

Per Gunnar Brundell and Karl Erik Arnold Jonsson, Gavle, Sweden, assignors to Soderhamns Verkstader Aktiebolag, Soderhamn, Sweden Application August 18, 1958, Serial No. 755,498

Claims priority, application Sweden June 28, 1954

9 Claims. (Cl. 144—208)

Figure 1:
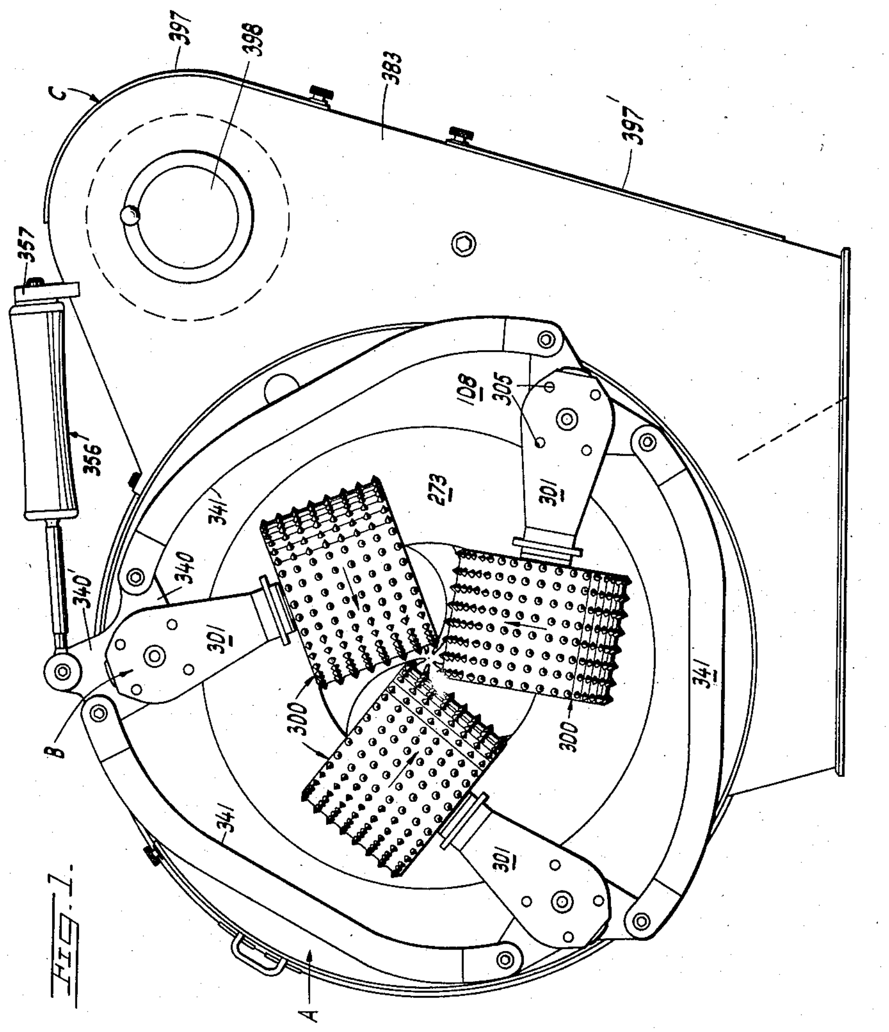

The present invention relates broadly to certain improvements in the art of removing bark from logs.

More particularly, this invention relates to the mounting of bark-removing means on the rotor of a rotary-ring-type debarking machine.

Specifically, the present application is a continuation-in-part application of subject matter disclosed and claimed in our prior filed application, Serial No. 651,325, filed April 9, 1957, entitled "Mounting Means for Swingable Debarking Tools of a Rotary-Ring-Type Debarker," and now abandoned, said application being a division of our prior filed application, Serial No. 517,832, filed June 24, 1955, now Patent No. 2,788,034, granted April 9, 1957, and entitled "Rotary-Ring-Debarker, Including Means for Disintegrating Slivers of Bark" and also of our prior filed application Serial No. 573,279 filed March 22, 1956, now Patent No. 2,857,945 granted October 28, 1958, and entitled "Machine for Removing Bark From Logs."

Thus, the present invention is directed to the mounting of debarking means on the rotary ring of a debarking machine, said debarking means consisting of a plurality of bark-engaging and -removing tips on the inner end of arms that are mounted on the rotary ring for swinging movement about axes parallel to the axis of rotation of the rotary ring.

Insofar as the claimed subject matter of this application is concerned, it is directed to improvements in the mounting of what can be termed a crescent-shaped tool on the end of a tool-supporting shaft in which each tool member includes a body portion that is crescent-shaped in elevation and has leading and trailing faces relative to the direction from which logs are fed to the machine, that has bark-engaging and -removing means associated with with the inner end thereof, such as in the form of a bark-deflecting web that extends parallel to the axis of the rotor, that has a blunt tip and in effect projects from the trailing face of the body portion; in which each tool member has a mounting flange associated with the end thereof remote from the tip; in which the rotor carries a shaft for each tool member, the shaft having an end projecting from one face of the rotor and being provided with a head structure having an axially extending slot therein for accommodating the associated mounting flange, and in which means are provided for fastening the respective mounting flanges to the respective head structures.

In our prior patent No. 2,787,304, dated April 2, 1957, and entitled "Machine for Removing Bark From Logs," we have illustrated and claimed what can be termed crescent-shaped tools that are swingably mounted about axes parallel to the rotor axis and are secured to tool-supporting shafts by what amounts to a splined connection. The present invention, therefore, has for a primary object to provide a rotary-ring debarker with an improved tool-mounting relationship.

It is a further object of the invention to provide a tool-mounting relationship in which the mounting flange, that projects from the trailing face of the body portion of each tool member, and the flange-receiving slot on the head of each tool-supporting shaft, are so positioned as regards the direction of extent of the flange and slot as to provide for the desired radius of turning of the tool tip during operation of the machine and make possible a lighter-weight tool-member structure with the additional advantage that there is lower inertia in the tool-turning system and the life expectancy of the tool is not impaired. In connection with the foregoing object, the mounting flange is disposed along the crescent of the body portion of the tool instead of transverse thereto.

It is a further object of the invention to provide a combined debarking tool and mounting relationship which facilitates disposing a plurality of tools about the rotor and which tools are of light-weight construction and are relatively thin in the direction that is transverse to the rotor axis so as to provide a maximum open space within the inner periphery of the rotor for the escape of bark.

It is a further specific object of the invention to provide a light-weight drop-forged crescent-shaped tool member having a bark-removing and -deflecting web at its inner tip and a mounting flange on its trailing face that extends at an angle to the line connecting the center of the turning supporting shaft to the tip of the tool.

It is an additional object of the invention, when the tools are made of sheet metal to provide the mounting flange with corrugations so that while the entire tool is of one gauge metal tne mounting flange can have an approximate thickness in excess of the thickness of the body portion of the tool for cooperation with a slot on the head of a tool-supporting shaft that is milled to a dimension in excess of the thickness of the gauge of the metal of the body portion of the tool.

Therefore, consistent with the foregoing, it is a particular object of this invention to provide in a debarking machine, a rotor having a plurality of tool-supporting shafts mounted therein and extending parallel to the axis thereof, each shaft having a head protruding from one face of the rotor and provided with an axially extending slot therein, a tool member for each shaft and including a body portion that is crescent-shaped in elevation, terminates in a bark-removing tip, has a mounting flange at the end thereof remote from the tip projecting from the trailing face of the body portion and positioned in the slot in the head with means being provided for fastening the mounting flange to the head.

Figure 2:
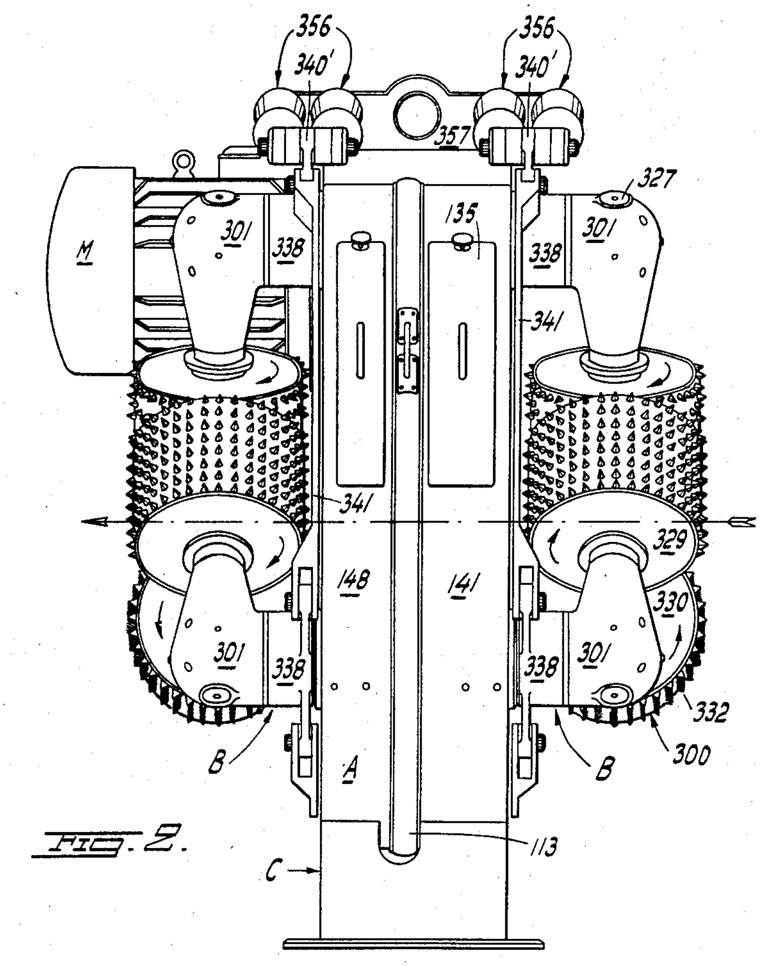
Figure 3:
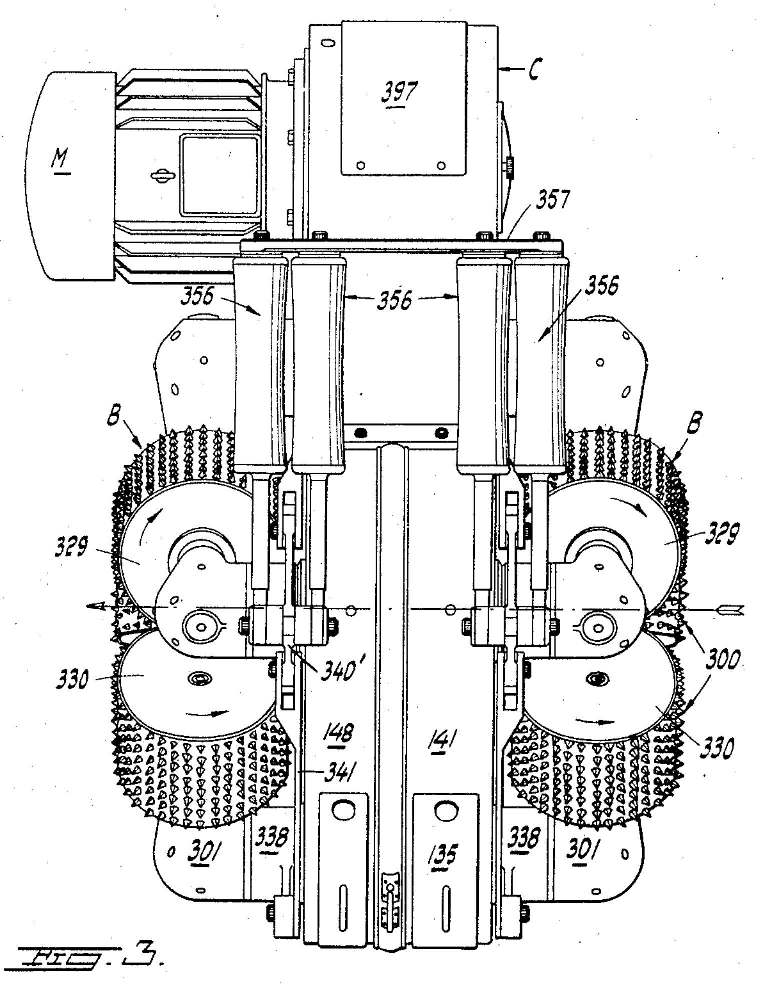
Figure 4:
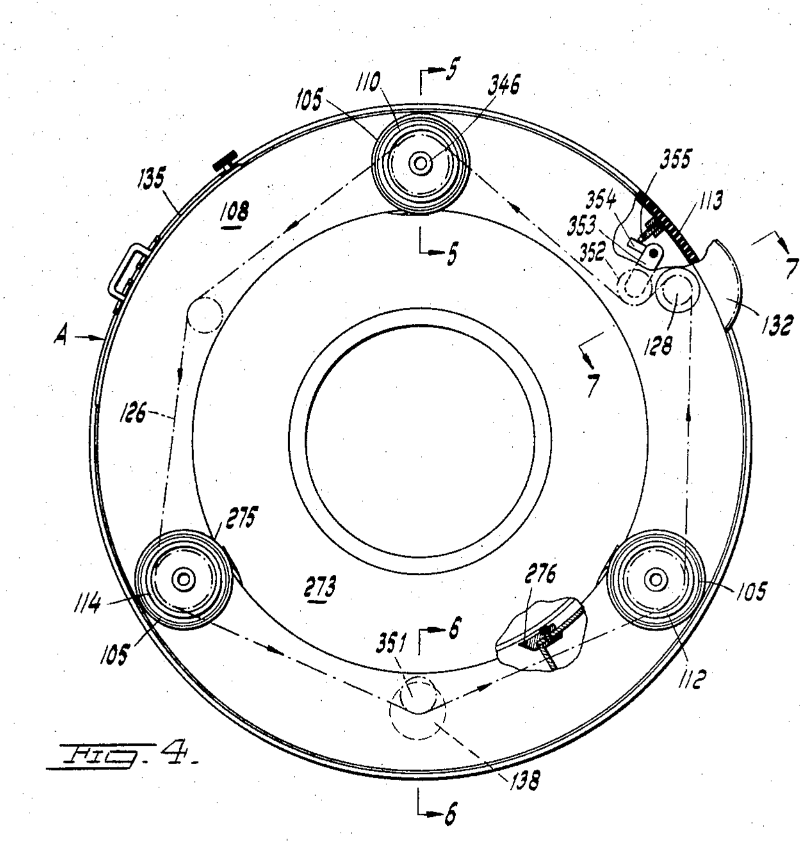
Figure 5:
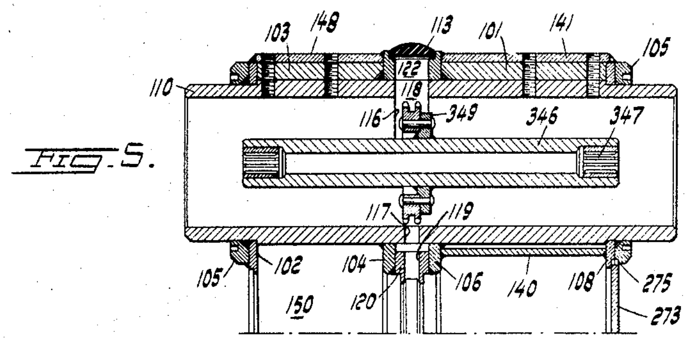
Figure 8:
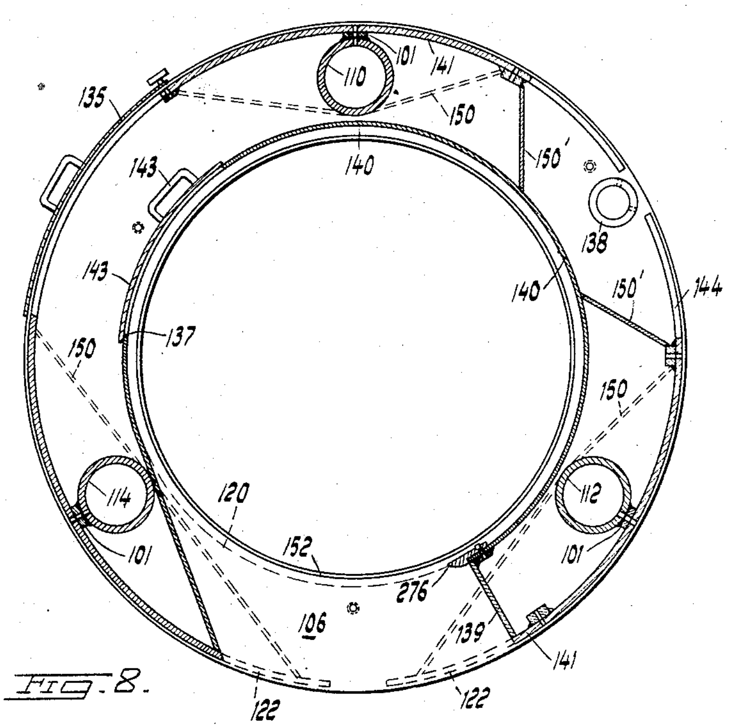
Figure 6:
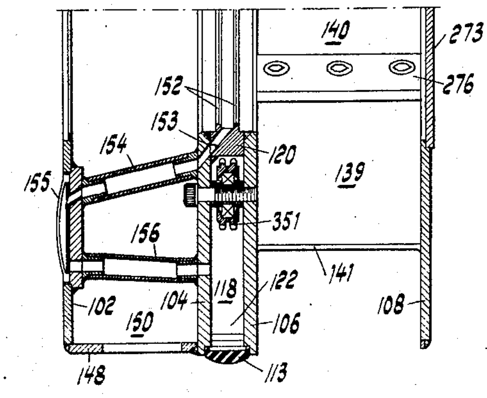
Figure 7:
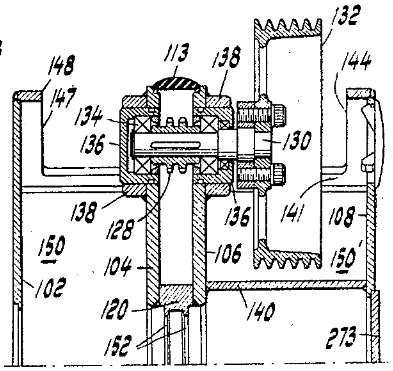
Figure 9:
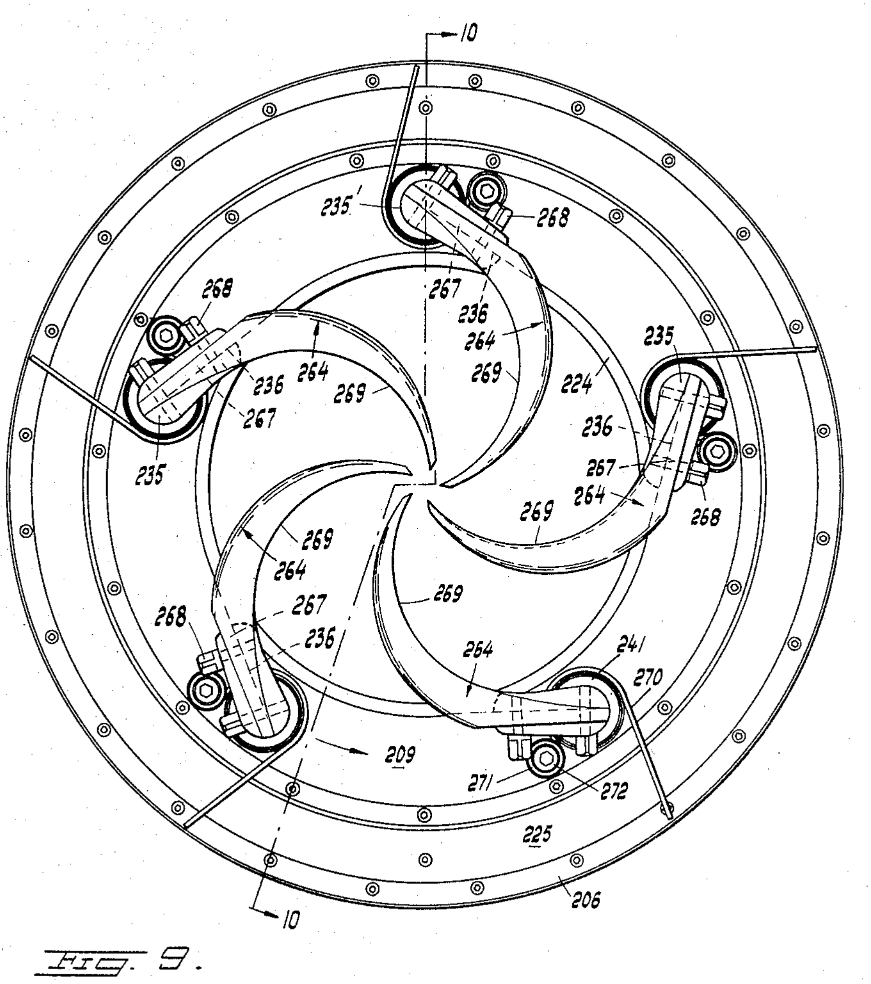
Figure 10:
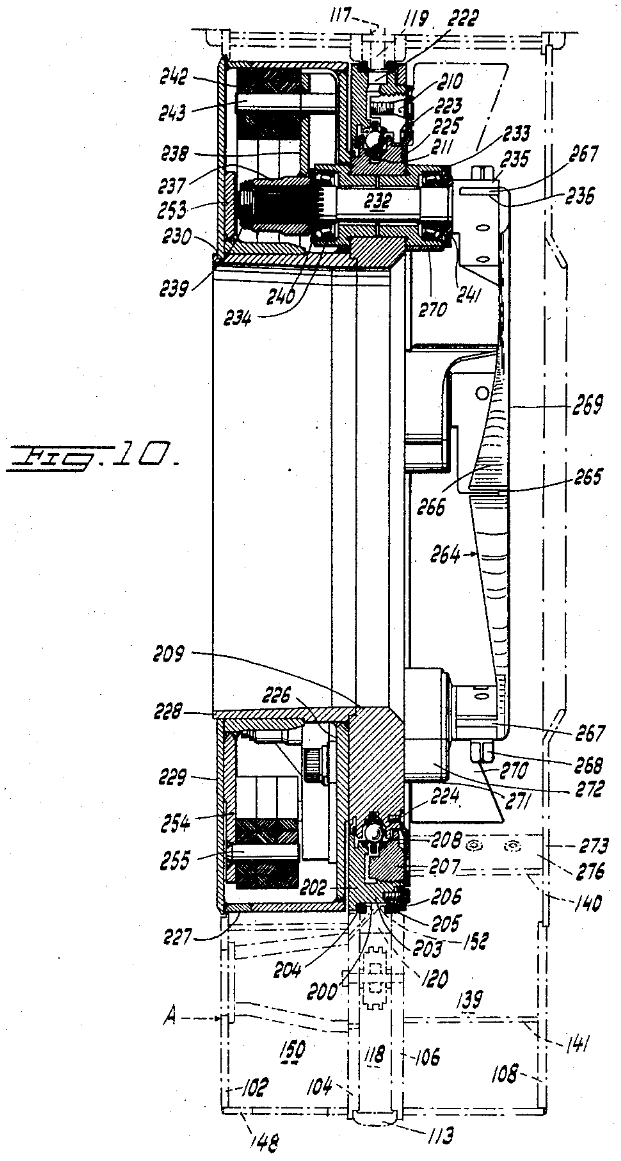
Figure 11:
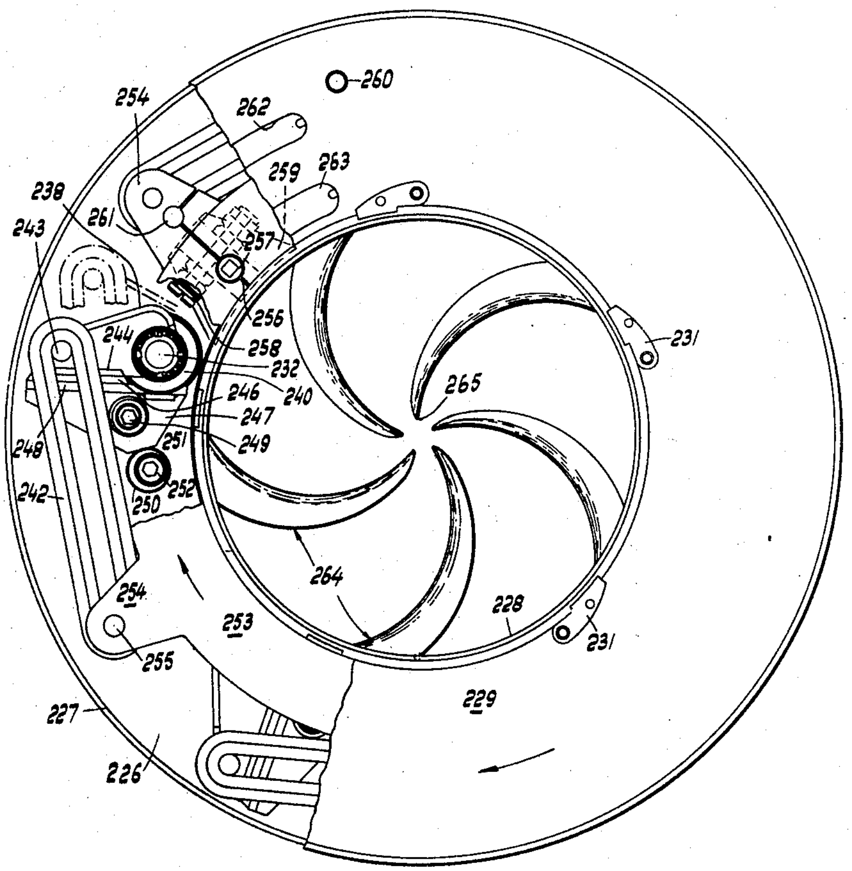
Figures 13, 14:
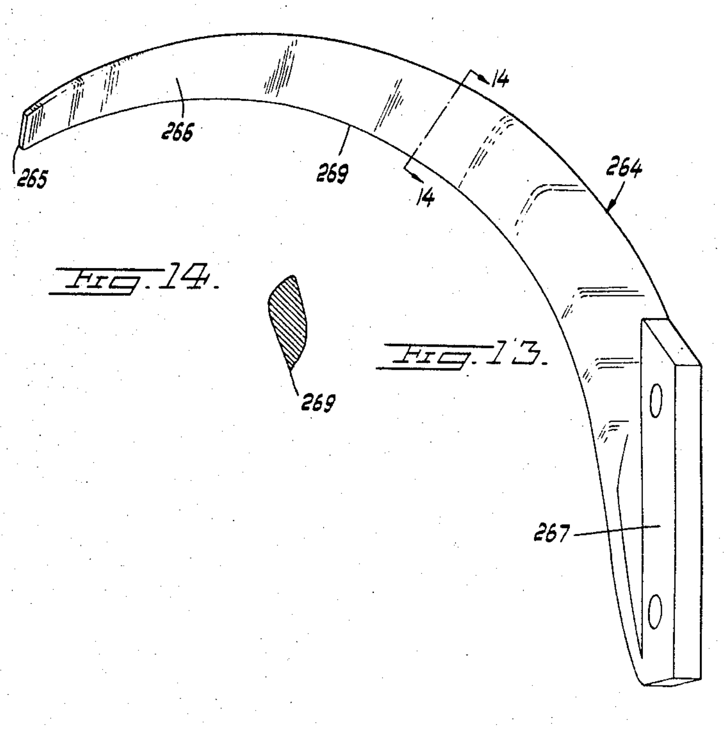
Figure 12:
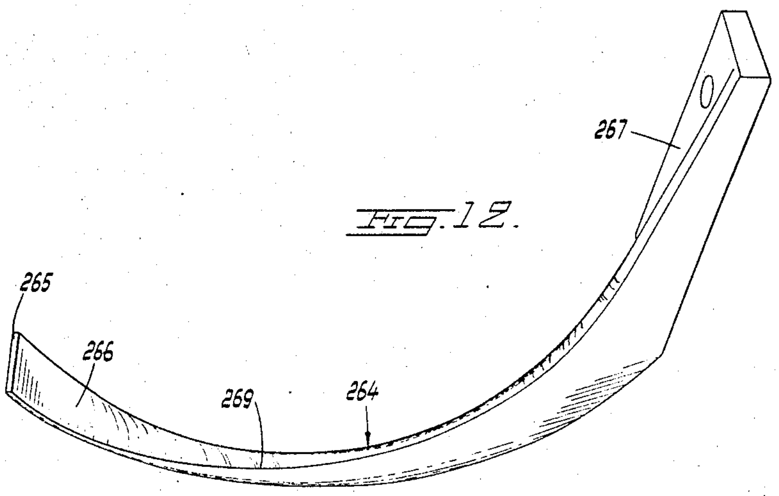
Figure 15:
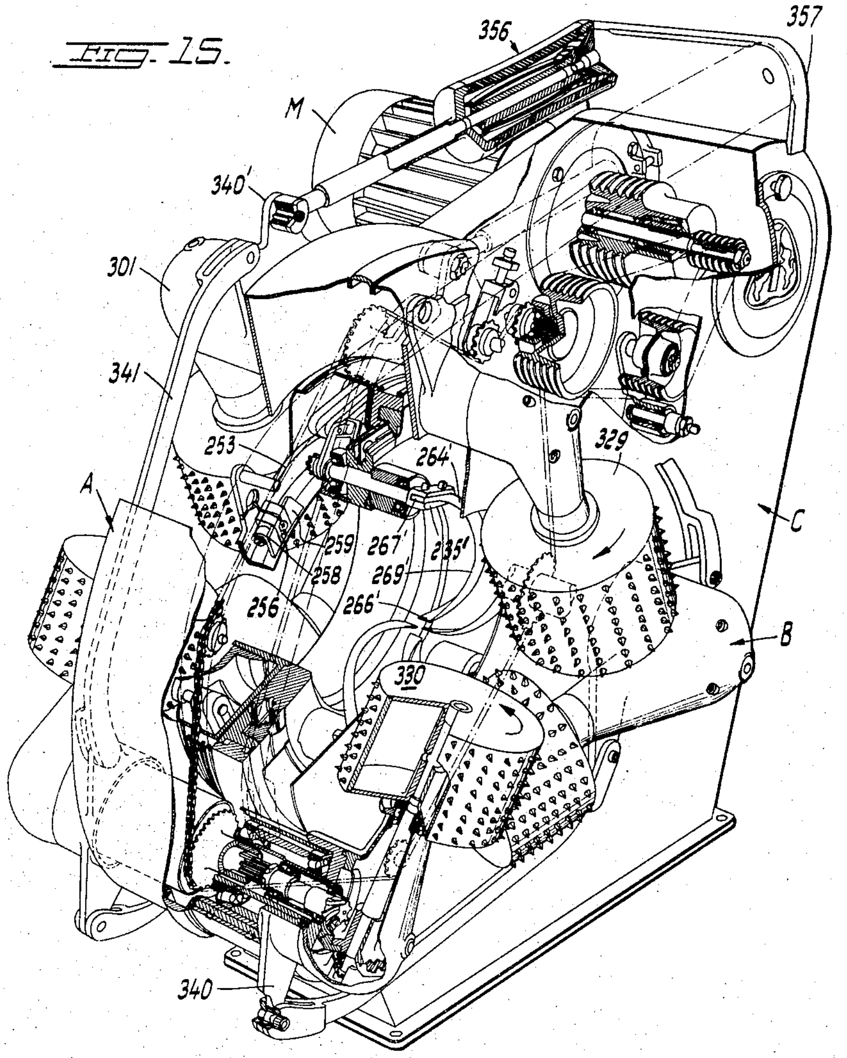
Figure 16:
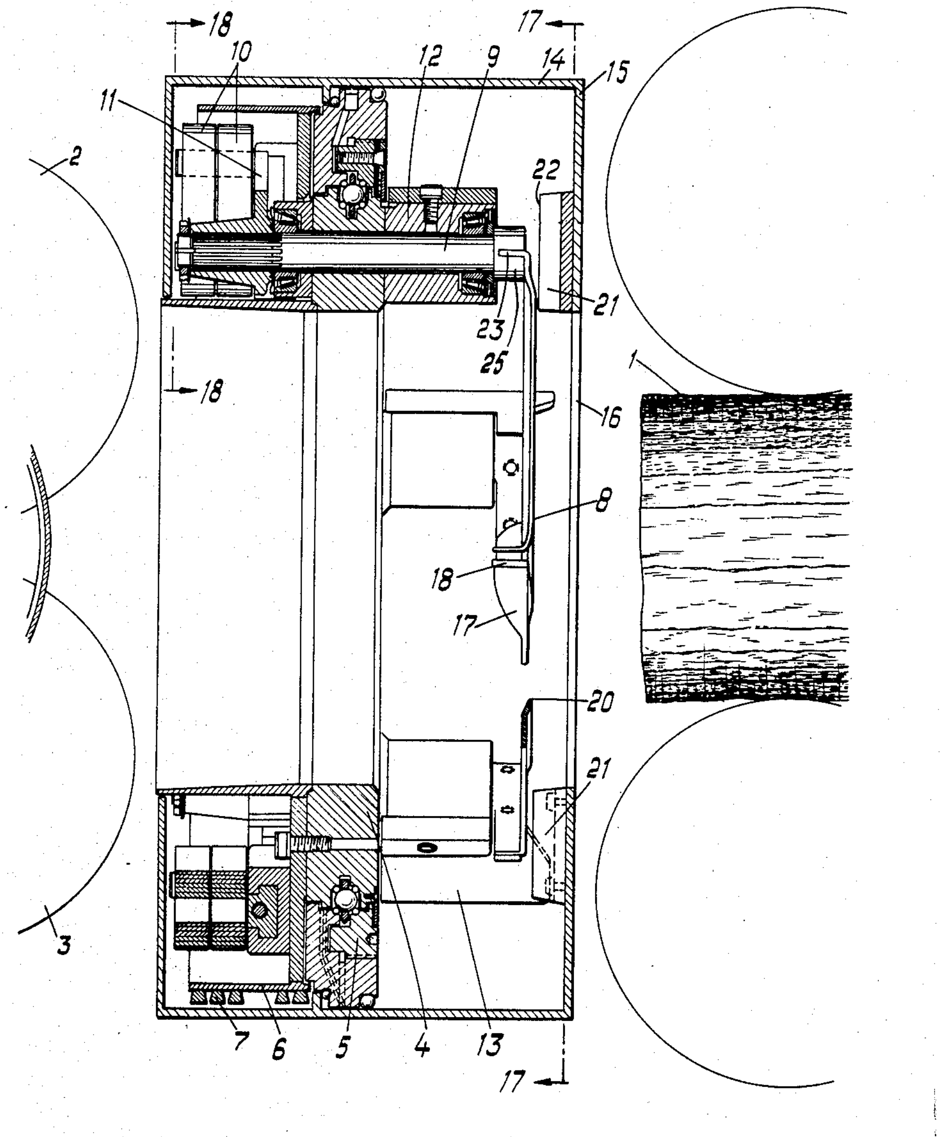
Figure 18:
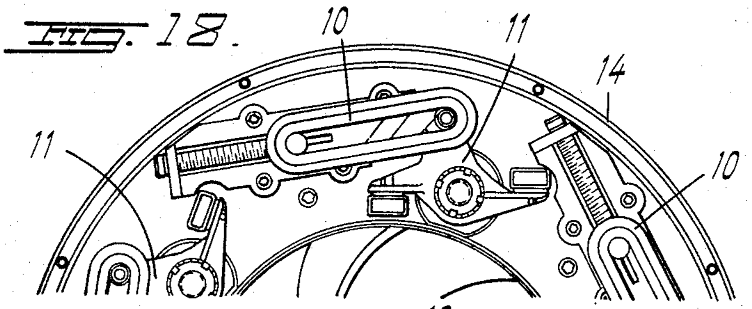
Figure 17:
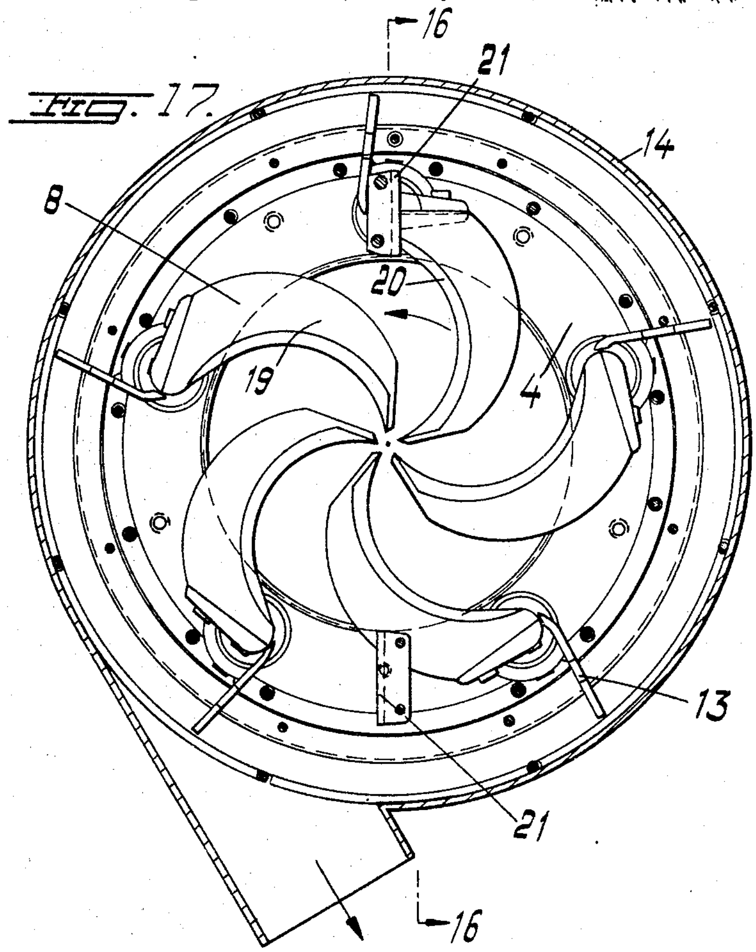
Figure 19:
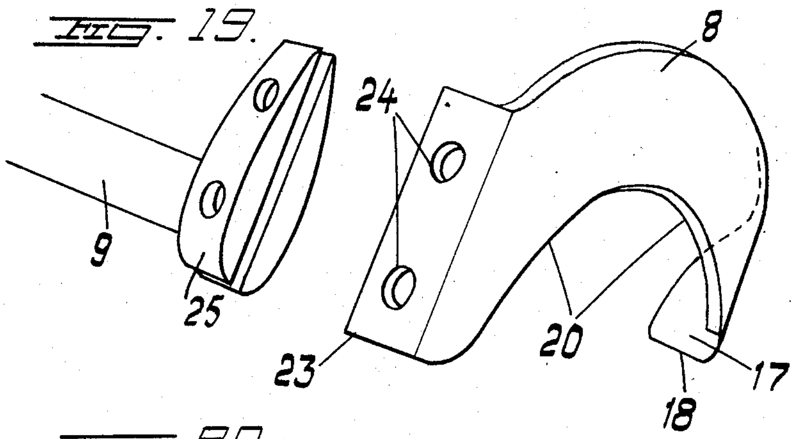
Figure 20:
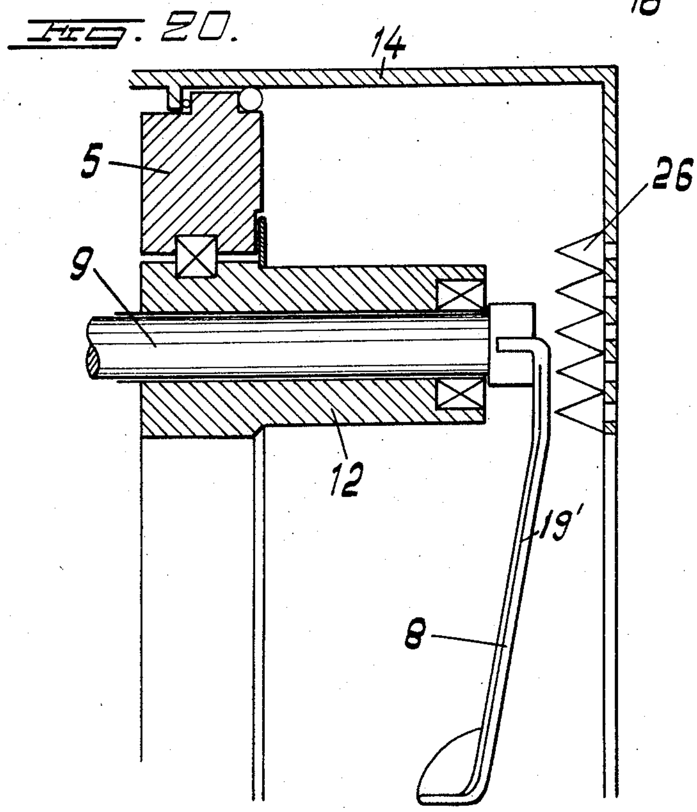
Figures 21, 22, 23, 24, 25, 26, 27, 28, 29, 30, 31, 32, 33:
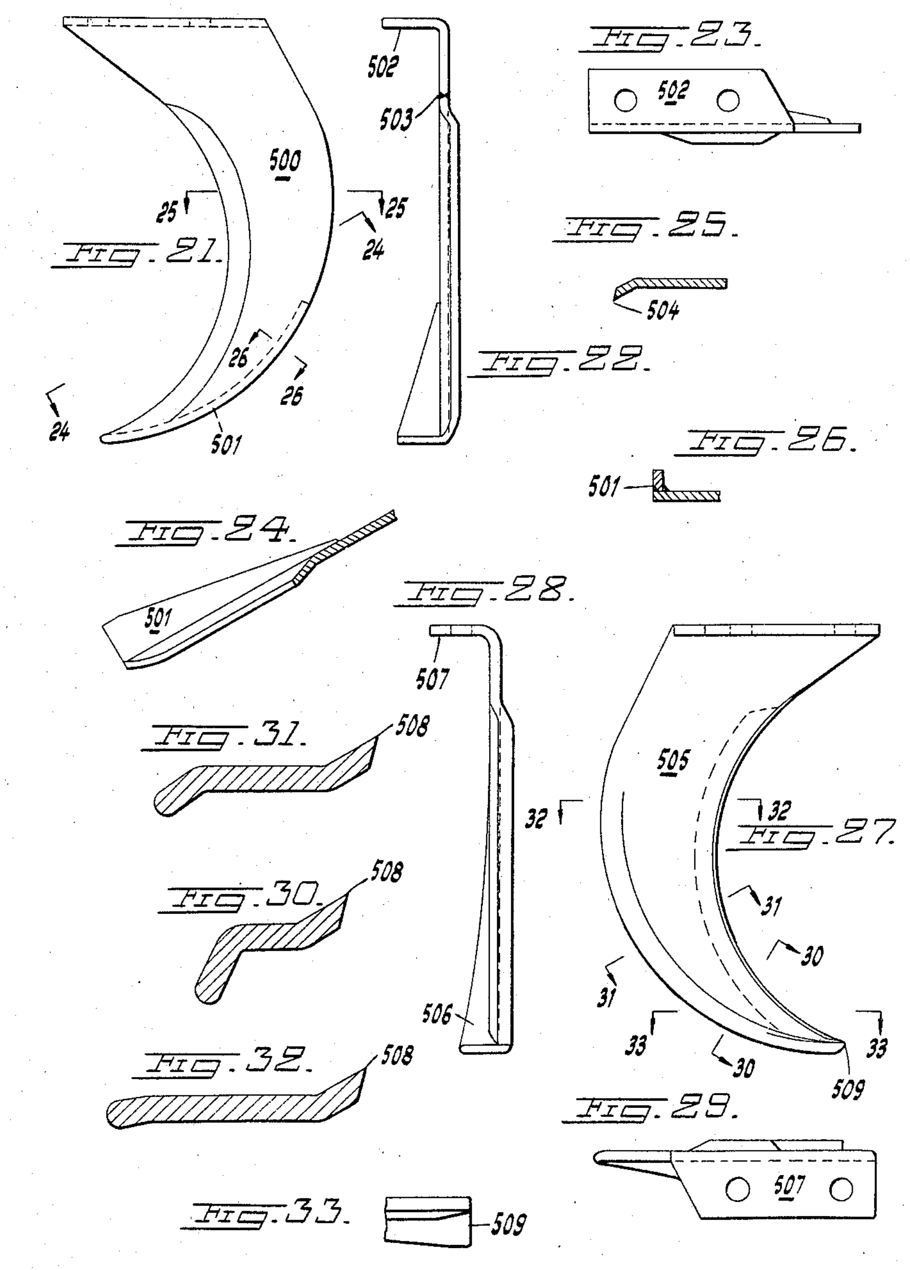
Figures 34, 35, 37:
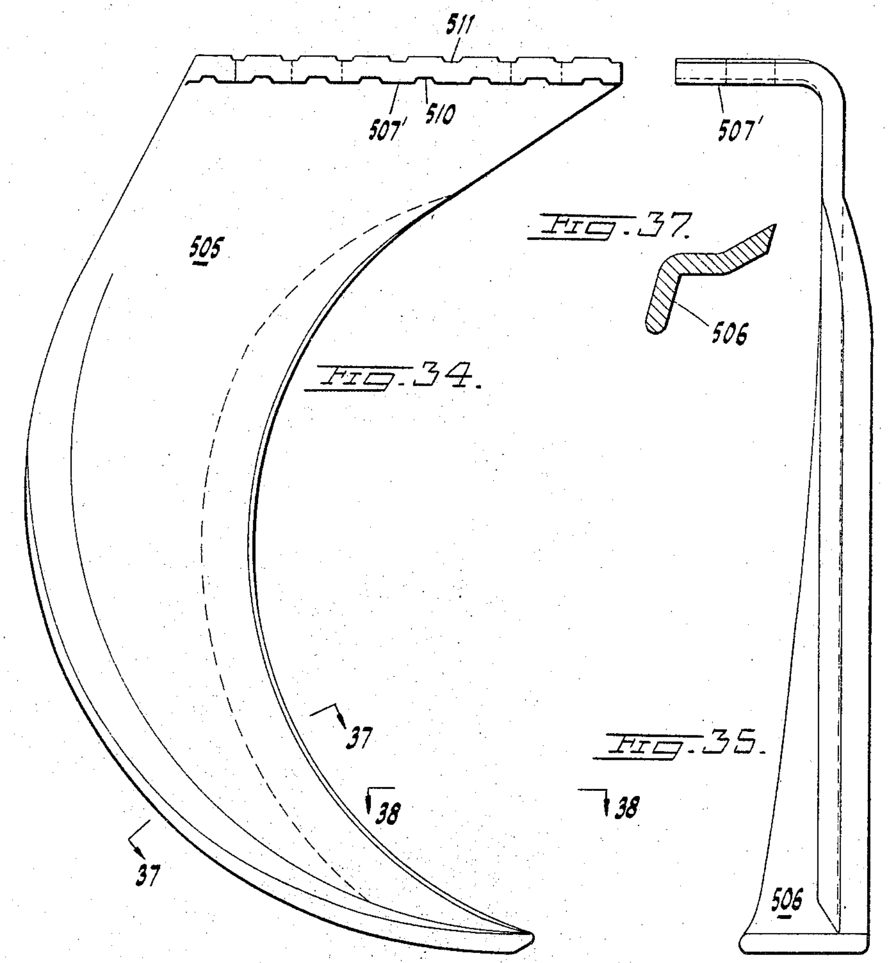
Figure 36:
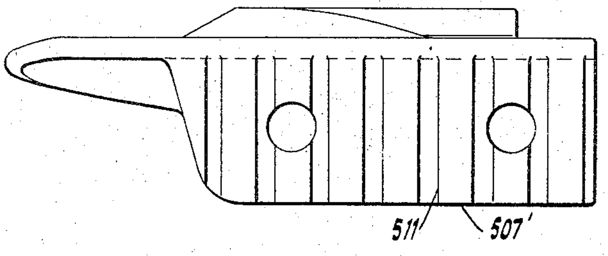
Figure 38:
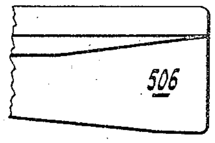
Figures 39, 40, 41, 42, 43, 44, 45, 46, 47, 48:
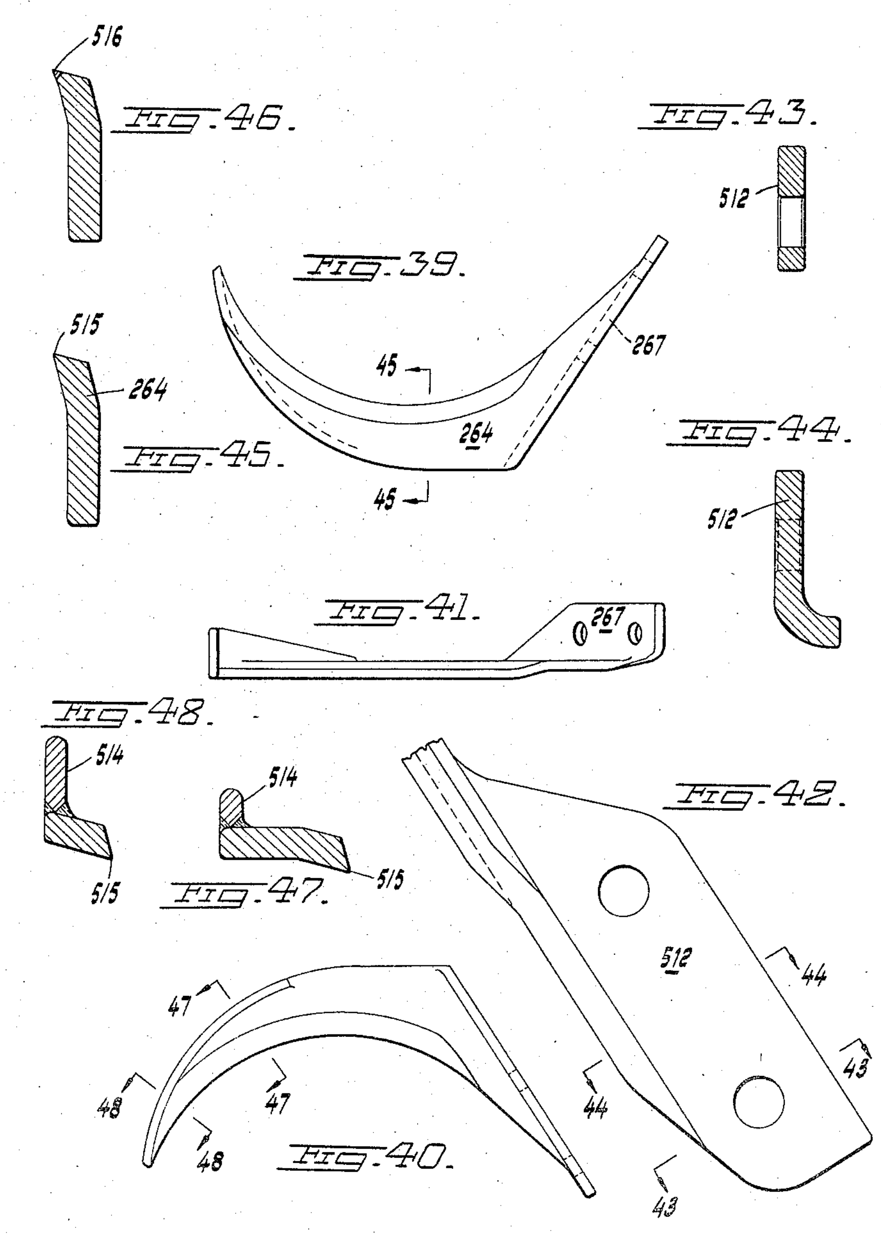
Figures 49, 50, 50A:
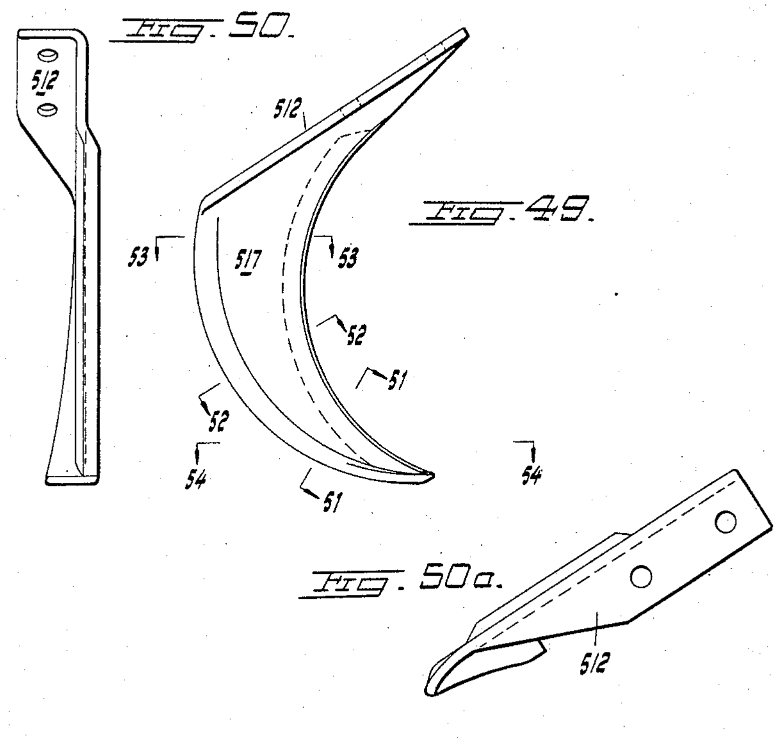
Figure 52:
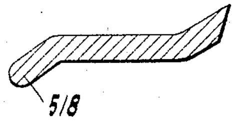
Figure 51:
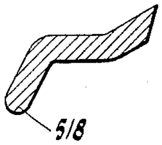
Figure 53:
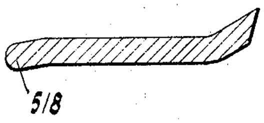
Figure 54:
Figures 55, 56, 57, 58, 59, 60, 61, 62, 63, 64, 65, 66:
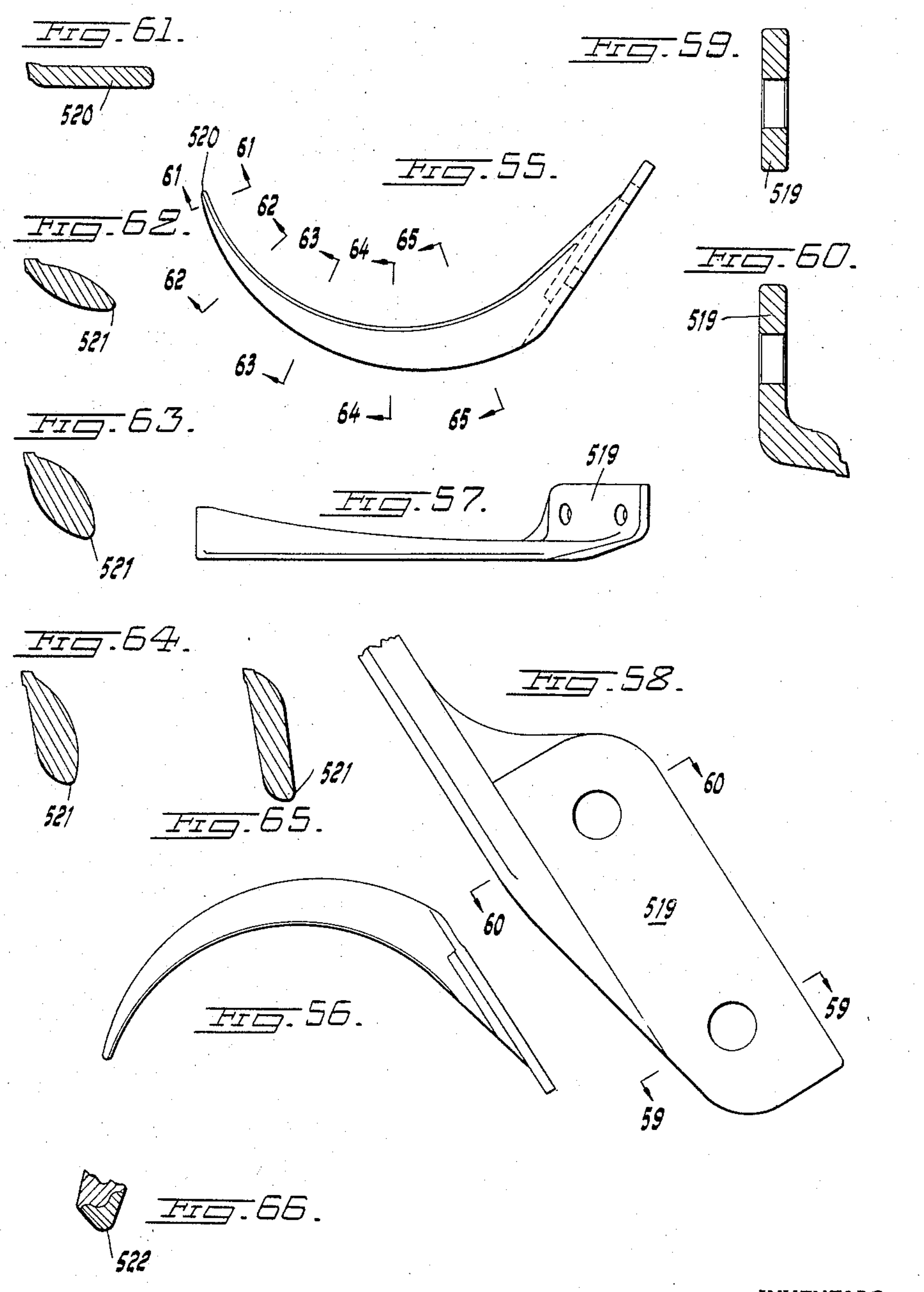

Further and more specific objects will be apparent from the following description taken in connection with the accompanying drawings in which:

Figure 1 is an end elevation of the infeed side of the debarker constructed in accordance with this invention, Figure 2 is a side elevation of the arrangement of Figure 1 as viewed from the left, Figure 3 is a plan view of the arrangement of Figure 1, Figure 4 is an end elevation partly broken away to show parts in section, and illustrates the infeed side of an annular frame, Figure 5 is a cross-sectional view on an enlarged scale taken along lines 5—5 of Figure 4, Figure 6 is a cross-sectional view on an enlarged scale taken along lines 6—6 of Figure 4, Figure 7 is a cross-sectional view on an enlarged scale taken along lines 7—7 of Figure 4, Figure 8 is a transverse, vertical sectional view taken through the annular frame in the bark-ejecting space thereof, Figure 9 is an enlarged-scale end elevation of the tool-carrying head assembly as seen from the infeed side, Figure 10 is a multiplanar, longitudinal cross-sectional view of the tool-carrying head assembly with some parts shown in elevation and taken along lines 10—10 of Figure 9, a portion of the annular frame being shown in dot-and-dash lines, Figure 11 is an end elevation of the outfeed side of the hollow-head assembly, Figure 12 is an enlarged-scale perspective view of an improved tool as it appears from the infeed side of the assembly, Figure 13 is a perspective view of the tool from the outfeed side of the assembly, Figure 14 is a cross-sectional view taken along lines 14—14 of Figure 13, Figure 15 is a view in perspective, with parts broken away, illustrating a modified debarking apparatus embodying the principles of the invention, Figure 16 is a longitudinal, vertical sectional view taken along line 16—16 of Figure 17 diagrammatically illustrating a modified rotary-ring-type debarker, Figure 17 is a transverse vertical sectional view as taken along the line 17—17 of Figure 16, Figure 18 is a fragmentary, transverse vertical section as taken on line 18—18 of Figure 16, and illustrates the mechanism for applying resilient or elastic force to the tools, Figure 19 is an exploded perspective view illustrating a specially shaped debarking tool and the mounting therefor, Figure 20 is a fragmentary, longitudinal sectional view illustrating a modified form of the debarking tool, Figures 21 and 22 are respectively a front elevation and a plan view of a tool similar to that shown in Figure 19, Figure 23 is a left-end elevation of the tool of Figure 21, Figures 24, 25 and 26 are sectional views taken respectively along lines 24—24, 25—25, 26—26 of Figure 21, Figures 27, 28 and 29 are views similar to Figures 21 to 23 but illustrating a modified form of the tool, Figures 30 to 32 are sectional views taken respectively along lines 30—30, 31—31, and 32—32 of Figure 27 and Figure 33 is a fragmentary view as seen from the viewing line 33—33 of Figure 27, Figures 34, 35 and 36 are views similar to Figures 27 to 29 but illustrating a further modification, Figure 37 is a cross-sectional view taken along lines 37—37 of Figure 34, Figure 38 is a fragmentary view of the tip end of the tool as seen from the viewing line 38—38 of Figure 34, Figures 39 and 40 are respectively front and rear elevations of a tool similar to that shown in Figures 12 to 14, Figure 41 is an end elevation of the tool shown in Figures 39 and 40, Figure 42 is a fragmentary view on an enlarged scale as seen from the viewing line 42—42 of Figure 40, Figures 43 and 44 are sectional views taken along lines 43—43, 44—44 of Figure 42, Figure 45 is a cross-sectional view taken along lines 45—45 of Figure 39, Figure 46 is a view similar to Figure 45 but illustrating a modification, Figures 47 and 48 are sectional views taken respectively along lines 47—47, 48—48 of Figure 40, Figures 49, 50 and 50A are views similar to Figures 27 to 29 but illustrating a further modification of the tool, Figures 51 to 53 are sectional views taken respectively along lines 51—51, 52—52 and 53—53 of Figure 49, and Figure 54 is a fragmentary view as seen from the line 54—54 of Figure 49, Figures 55 to 58 are views similar to Figures 39 to 42 but illustrating a still further modification, Figures 59 and 60 are sectional views taken respectively along lines 59—59 and 60—60 of Figure 58, Figures 61 to 65 are sectional views taken along lines 61—61, 62—62, 63—63, 64—64 and 65—65 of Figure 55, and Figure 66 is a fragmentary cross-sectional view on an enlarged scale of the bark-removing tip of the tool shown in Figure 56.

As illustrated in the drawings, the improved characteristics of the present invention provide a unique combination of components that results in a compact, lightweight, readily serviceable debarking machine. The debarking machine of the invention incorporates an annular frame, a tool-carrying-head assembly including a stator carried by the frame and a rotor within the stator carrying the tools, means for mounting the tools on the rotor for pivoting movement about axes parallel to the axis of rotation of the rotor, means for normally urging the tools toward the axis of rotation of the rotor, infeed and outfeed mechanisms supported by the annular frame on the respective faces thereof, means for driving these mechanisms to not only feed logs through the rotor but to center the same therein, mechanisms for urging the roll components of the feed mechanisms toward the axis of rotation of the rotor and for synchronizing the movements of the individual components of the respective feed mechanisms, and means for supporting the stationary frame.

A debarking machine embodying the aforementioned features is illustrated in Figures 1 to 3, in which the stationary annular frame is denoted at A. The tool-carrying assembly housed within the frame is not visible in these figures. The log-infeed and log-outfeed mechanism is denoted generally at B, while one form of base structure that supports the annular frame is denoted at C.

In utilization, the logs are fed from right to left in Figure 2 and in advance of the infeed mechanism is a suitable log conveyor which delivers logs end to end to the rollers of the infeed mechanism, while beyond the feed rolls of the outfeed mechanism is an additional conveying means which delivers debarked logs for piling or other disposition. Since any one of the conveying arrangements or log hauls known in the art can be operatively associated with the debarking machine of this invention, the same have not been illustrated.

*The stationary annular frame*

The stationary annular frame A is more clearly illustrated in Figures 4 to 8. This annular frame is a multipurpose frame, and includes four symmetrically apertured sheet-metal rings 102, 104, 106 and 108. These rings have three equispaced apertures therein within which is disposed three thick-walled tubes 110, 112 and 114. The axes of the three tubes are perpendicular to the flat surfaces of the four sheet-metal rings and they form apices of an imaginary equilateral triangle, the center of which coincides with the center line of log travel. The sheet-metal rings are spaced axially from one another. Spacer means 103 are welded between the rings 102 and 104 and to the outer surface of the respective tubes. Additional spacer means 101 are welded between the rings 106 and 108 and to the exterior of the respective tubes. Collars 105 surround the end of each tube that protrudes beyond the opposite end rings 102 and 108, respectively. The spacing of the rings axially of one another is such that the rings 104 and 106 are closely spaced, and half-way between the ends of the respective tubes there is provided a slot 116 that extends perpendicular to the axis of the tube and occupies more than one-half the circumference of each tube. The purpose of this slot will be set forth hereinafter, and each slot faces a direction opposite to that extending toward the center of the imaginary triangle referred to above.

The arrangement just described results in an annular space 118 being formed between the two innermost rings 104 and 106. This space is closed at its inner periphery by a circular strip 120 which is welded to the two inner rings. The outer periphery of this space is partially closed by evenly spaced segments 122 of a circular strip that has the same width as the strip 120. The openings between these segments provide access to the annular space 118. This annular space accommodates the sprockets and chain of a chain transmission for the feed works, which will be described hereinafter. The chain is denoted diagrammatically at 126 in Figure 4, and is driven by a sprocket 128, Figure 7, attached to a shaft 130, the free end of which carries a V-belt sheave 132. The shaft 130 is journaled in ball-bearing means 134 carried by cup members 136 that are sealed within aligned apertures in the central sheet-metal rings 104, 106. The cup members are mounted in rings 138 that are welded to the outside of the immediately aforementioned sheet-metal rings. The preferred mounting of the multi-purpose frame is such that the plane of the imaginary equilateral triangle is vertical with the side thereof nearest the ground being horizontal. This means that the thick-walled tube 110 is at the top of the frame, while the other two tubes 112 and 114 are at the lower part thereof and on the same level and the respective tubes are 120° apart.

The frame, from right to left in Figures 5 to 7, includes a partially cylindrical and partially planar strip 140 that is welded between the outfeed side of ring 108 and the infeed side of ring 106 near the inner periphery thereof. This strip 140, as shown in Figure 8, constitutes a hood for the collection and ejection of bark in a direction tangential to the inner circumference of the sheet-metal ring. Spanning the outer peripheries of the rings 106 and 108 and welded thereto is a partially cylindrical strip means 141. The strip means 141 is omitted between two adjacent thick-walled tubes so as to provide an outlet for an ejection spout. As shown in Figure 8, the inner strip means 140 has its planar end portion connected to one end of the strip means 141 so as to define one side of the ejection spout, while a short plate member 139 is welded between the other end of strip 140 and the adjacent end of strip means 141. The ejection spout can be disposed to eject the bark downwards, as shown in Figures 1 and 8, or, if desired, it can be disposed between the tubes 110 and 114 so as to eject the bark sideways, in which case access to the debarking tools is readily gained through the ejection spout.

When the bark is ejected downwards, as shown, it is necessary to provide an access opening as at 137. This opening can be closed by a closure means 143, the inner face of which functions as part of the bark-collecting hood. An additional lid or closure 135 closes the space betwen two adjacent strip means 141 that closes the outer periphery of the space between the rings 106 and 108. A gap is provided as at 144, which is cut out of the strip means 141 to accommodate the V belt sheave 132 that drives the sprocket 128 that turns the chain 126. A multi-grooved V belt 396 for turning the sheave 132 is shown diagrammatically in Figure 19 of our aforesaid Patent No. 2,857,945.

The outer periphery of the space between sheet metal ring 104 and sheet metal ring 102 is closed by a strip means 148. There is a gap 147 in this strip in the same position as the gap 144 that accommodates a multi-grooved V belt 133, diagrammatically illustrated in Figure 18 of our last-mentioned patent, for turning the rotor of the hollow-head assembly.

The inner circumference of the space between sheet metal rings 104 and 102 is not closed. Instead, six straight metal strips 150 are welded between the two sheet metal rings to extend tangentially from opposite sides of each of the thick-walled tubes and in welded connection with the inner periphery of the outer strip means 148. Two similar strips means 150', illustrated in the upper right hand portion of Figure 8, are disposed between the plates 106 and 108 to form the sides of the gap 144 that accommodates the V belt for the sheave 132 that drives the sprocket 128 that drives the chain 126.

The circular strip 120 that closes the inner periphery of the space 118 is machined to form axially spaced flanges 152 which partake in the mounting of the tool-carrying-head assembly within the annular frame.

*The tool-carrying-head assembly*

The tool-carrying-head assembly D is illustrated in Figures 9 to 11, and comprises a stator, a rotor carrying five pivotally mounted tools, bearing means for the rotor and actuating means for the tools. The stator comprises a flanged ring member 200. The ring includes an external flange 201 and an internal flange 202. The ring is L-shaped in cross section and the base 203 of the L, as viewed in Figure 10, is internally threaded. The stator is mounted within the annular frame by sliding it in from left to right, in Figure 8, until the flange 201 bears against a giant O ring packing 204 that bears against one of the flanges 152 on the ring member 120. An additional O ring 205 is disposed between the other flange 152 and the outer periphery of the part 203 of the stator. A locking ring member 206 is then bolted to the face of the stator.

The stator is completed by an externally threaded, ring-shaped giant screw 207 that is threaded within the internally threaded part 203 of the ring 200. On the confronting faces of the flange 202 and the screw ring 207 are formed grooves for accommodating an outermost pair of wires 208 that define running surfaces for a four-point ball bearing. The other two running surfaces are provided by similar wire rings housed in grooves formed on the outer periphery of a sturdy rotor ring 209. By rotating the ring-shaped screw 207 the outer two wires can be moved toward one another until they press the balls of the bearing against the two inner wires. If the pressure is high enough the balls will exert a cold-rolling action on the four wires during the first few revolutions of the rotor. This cold-rolling action will provide running surfaces on the wires having a mirror finish and conforming to the curvature of the balls. The ring-shaped giant screw 207 is split and in the center of the split is disposed a conical screw 210. By turning this screw the giant screw 207 can be expanded whereby it is efficiently locked in the threads formed on the interior of the part 203 of the stator. If the running surfaces of the wires are worn to a degree that sets up play, the bearing is readily tightened by loosening the conical screw 210 and turning the giant screw 207. The individual balls in the ball bearing can be separated by separators 211, as shown. However, the bearing may operate successfully without the use of any ball separator, thus reducing the costs of the bearing.

The giant O rings 204 and 205 are made from oil-resistant rubber and they are held in place by the force applied when the ring 206 is moved toward the flange 201. The fastening of the stator, and thus the hollow-head assembly, within the annular frame A by interposing the giant O rings in the mounting avoids metallic contact between the head assembly and the annular frame. In addition, the machining of the different flanges can be made without worrying about close tolerance, since the elastic joint prevents the possibility of transmitting any distortion in the welded annular frame to the head assembly. Furtheremore, the giant O rings, being elastic, provide an efficient sound stop or dampening means for the sount that is generated by a large ball bearing, the debarking machine of the invention being, therefore, comparatively quiet. The giant O rings further function as a seal for the oil that lubricates the ball bearing.

The sump for the oil is formed in the space 118 between the two middle rings 104 and 106 of the annular frame. The oil is lifted from the sump by the chain 126. Part of the oil carried by the chain is discharged through the slot 116 into the uppermost thick-walled tube 110. The oil flows down into the bottom of the tube and thence by gravity through a hole 117 in the bottom of the tube 110, thence through a conduit or hole 119 in the strip member 120 to a conduit or hole 222 formed in the part 203 of the stator. The oil then flows through the ball bearing to discharge through outlet holes, not shown, on each side of the bottom point of the stator. The oil thus gets in the space between the flanges 152 at the bottom of the assembly. A discharge opening 153, see Figure 6, is formed in the bottom of the ring 120 which, through a hole formed in ring 104, communicates through a pipe conduit means 154 that leads to a sight-glass structure 155 and thence through a pipe 156 and another hole through the sheet-metal ring 104 to the sump formed in the space 118. Thus, through the sight glass 155 the flow of oil and the oil level can be checked. To prevent oil from leaking between the rotor and the stator of the tool-carrying-head assembly, these components are provided with tongues 224 which form a labyrinth seal. On the infeed side of the rotor 209 there is a further mechanical seal comprising a thin, conical metal ring 223 resiliently pressed against and thus sliding on the infeed face of the screw ring 207. This thin metal ring or lip is shielded or guarded by a thicker ring 225 that is bolted to the rotor, the ring 225 shielding the sealing lip or ring from the impact of pieces of bark.

The spaces between the segments 122 provide access to the interior of the space 118 between the middle sheet-metal rings of the frame. As shown in Figures 5 and 6, the middle rings of the frame are flanged or shouldered at their outer periphery and a heavy synthetic-rubber ring 113 is applied over the outer periphery of the segments 122 so as to close and seal the space 118 and to prevent leakage of any oil from the sump.

The drive for the hollow head is transmitted by a V-belt arrangement. The V belt 133 of our aforesaid Patent No. 2,857,945, can be of the type embodied in U.S. Patent No. 2,728,239 to Adams, so as to ensure adequate power transmission. The rotor 209 has bolted to the face thereof on the outfeed side of the apparatus a sheave structure comprised by an apertured annular member 226, an interconnected sheave member 227 and an internal and interconnected, slightly conical hub member 228. These three components are welded together and the exterior of the sheave member 227 receives the power-transmission belt 133 of our just-mentioned patent. The external diameter of the sheave is approximately the same as the external diameter of the stator member 200. The minimum internal diameter of the hub member 228 is the same as the internal diameter of the rotor 209. At the outfeed end of the hub 228 is fastened a thick metal lid 229. The lid is fastened in place by a bayonet joint. The outer periphery of the lid is so dimensioned as to rest on the rim of the sheave member 227 so as to enclose a hollow anular space on the outfeed side of the tool-carrying-head assembly. Within this space is located the means for applying force to the tools to urge them inwardly and means for limiting the inward movement of the tools. As shown in Figure 11, the hub 228 is provided with circumferentially spaced cutouts communicating with a groove 230. The internal periphery of the lid 229 has inwardly extending lugs thereon. These lugs fit through the cutouts and then the lid is turned to dispose the lugs within the groove, following which pivotally mounted latches 231 are swung inwardly to engage in the cutouts to hold the lid in place.

The debarking tools are carried by shafts 232, each parallel to the axis of the rotor and passing through circumferentially spaced apertures in the rotor 209. Within each of these apertures are disposed a pair of bushings 233 having internal seats for heavy, tapered roller-bearing means 234 that journal the shaft. The bushings can either be welded within the apertures in the rotor or press-fitted therein. As viewed from the right in Figure 10, the end of the shaft 232 carries a wing-shaped head 235 having a milled groove 236 therein for receiving a flange on the debarking tool. The opposite end of the shaft is splined for a distance beyond the left-hand bushing 233 and has a reduced, externally threaded terminal end. A tool-actuating and -stopping lever includes an internally splined tubular portion 237 and a lever portion 238. The internally splined portion is fastened over the splined end of the shaft 232 and a flat nut 239 is engaged over the externally threaded terminal end of the shaft. By tightening this nut the two tapered roller bearings 234 can be tightened against each other, if desired. The nut is held in place by a suitable lock washer. Each of the roller bearings is provided with double seals 240, each seal consisting of two thin metal rings clamped to the inner rings of the bearing, the outer lips of these thin metal rings being resiliently pressed against and in sliding contact with the end face of the outer ring of the bearing and the end face of the left-hand bushing, respectively. This clamping force is exerted by the internally splined portion of the lever on the left of the bearing in Figure 10, and by a closure ring 241 arranged within the other bushing, this ring preventing mechanical damage to the seal by shielding the same from chunks or pieces of bark. The torque transmitted to the tool shafts to effect the desired pressure of the tips of the tools against the wood surface of a log being debarked is generated by rubber means such as endless rubber straps or bands 242. Accordingly, from the face of each lever 238 extends a comparatively long pin 243, each pin being parallel with its associated tool shaft 232. To prevent the shaft from turning further than required with regard to the minimum log diameter, each lever part 238 is provided with a flat face 244. This flat face 244 bears against a rubber cushion 246 that is bonded to a stop member 247. The stop member is triangular in elevation and is of L shape in cross section, having an outwardly directed flange 248 to which the rubber cushion 246 is bonded. Centrally of the triangular portion of this stop member is an aperture accommodating with clearance a large screw 249 that is fastened in the rotor ring 209. By tightening this screw, the head of which bears against a washer on the exterior of the stop member 247, the latter is clamped to the outfeed face of the annular member 226 that forms part of the driving sheave. When this screw is loosened the triangular stop member, and thus the rubber cushion 246, can be moved a distance determined by the clearance between the hole and the screw. To insure that the rubber cushion 246 is maintained in parallelism with the corresponding surface on the lever 238, when regulating the position of the tools for minimum diameter, the stop member 247 is provided with a machined cylindrical notch on the face thereof bearing the rubber cushion 246. The diameter of this notch is the same as the outside diameter of the bushing 233 that is on the outfeed side of the rotor. When this cylindrical notch slides in contact with the bushing the rubber cushion and the flat face 244 are always maintained in parallelism. In order to provide for fine adjustments the clamping screw 249 is loosened and an eccentric washer 250 is turned. As shown in Figure 11, the face of the stop member 247 opposite the rubber cushion is flattened as at 251, and the eccentric washer 250 bears against this flat surface. When the tool tip has reached its desired inward position the eccentric washer is clamped in position by tightening a screw 252 that is threaded into the rotor ring 209, there being a suitable hole in the annular ring 226 to accommodate this screw. After the two clamping screws have been tightened the eccentric washer serves as a protection against undesired movement of the rubber cushion 246 occasioned by heavy blows from the lever 238 upon rapid swinging movements of the tool 264 to its innermost position.

The tensioning of the rubber straps is applied and regulated as follows:

On the outer periphery of the hub 228 there is a carefully machined cylindrical surface providing a seat for a ring member 253. This ring member is L-shaped in cross section and includes a cylindrical portion parallel with the axis of the machine and engaged on the cylindrical surface of the hub. The annular flat portion of this member 253 extends perpendicularly from the rotor hub 228 and is disposed very close to the interior of the lid 229. At the outer periphery of this part of the ring member are five triangular projections or lugs 254. Pins 255 are welded to each of these five projections and these pins extend parallel to the pins 243 but toward the annular member 226 of the rotor. Around each of the associated pins 243 and 255 are trained the rubber straps 242. At the center line of one of the triangular projections or lugs the L-shaped ring 253 is provided with a radial cut or split 256. This cut is enlarged intermediate its length and disposed therewithin is an eccentric 257, making it possible to expand the ring to loosen the same on the surface of the hub and to permit the ring to contract. The contraction force applied to the ring to fasten it to the hub is exerted by a pack of Belleville springs 258 associated with lugs 259 carried by the back side of the ring 253.

It is therefore seen that when this ring is moved on the machined surface of the hub in relation to the other components carried by the rotor, the rubber straps 242 can be stretched or slackened to provide a desired tool pressure.

The movement of the L-shaped ring 253 is effected as follows:

The force for stretching all the rubber straps on the rotor is comparatively high and is generated by a hydraulic jack of the type that can be used for automobiles. Such a jack consists of an oil reservoir and a lever-operated hand pump arranged at the end of a long tube, the interior of which constitutes a cylinder for a long plunger having a diameter of approximately 1″. At the end of the tube and at the end of the plunger are lugs facing in a direction approximately perpendicular to the longitudinal axis of the plunger. The lid 229 is provided with a cylindrical hole 260 and the triangular lug 254 adjacent the split portion of the ring 253 is provided with a similar hole 261. The lug on the cylinder of the jack is introduced into the hole 260 and the lug on the tip end of the plunger is introduced into the hole 261, access to this hole being furnished through a slot 262 in the lid. When oil is pumped into the cylinder the force of the plunger counteracts the contracting force exerted by the pack of Belleville springs 258. When the plunger is moved further the friction grip between the inner periphery of the ring member 253 and the machined surface on the hub 228 is loosened and the ring 253 can now slide on the hub. The force of the hydraulic jack is now almost entirely utilized to stretch the rubber straps. When the desired tension in the straps has been attained the oil pressure in the cylinder of the jack is released by a small control valve provided therewith, the Belleville spring packet coming into operation instantly to contract the ring 253 to a positive friction grip on the hub at the new position attained by the ring 253.

To decrease the tension in the rubber straps the following procedure is followed:

The eccentric 257 is provided with a square socket, gripping access to which is gained through another slot 263 in the lid 229. When the eccentric is turned by turning the handle of an angular lever, which has a square stud that has been engaged in the socket of the eccentric, the ring 253 is expanded. The friction between this ring and the hub is then overcome by the tension in the rubber straps 242 and the ring 253 tends to move in relation to the hub to decrease the tension of the straps. The eccentric and lever carrying the stud are so arranged that when the tension ring moves and the tip of the lever or handle thereof is held in a fixed position by hand, the eccentric turns in such fashion that the tension ring 253 is contracted and stopped. In this way the movement of the tension ring 253 is quiet and controlled.

The rubber straps are preferably made from natural rubber and are so designed that, at maximum elongation, the distance betwen the two pins around which the straps are passed is 280% of the corresponding distance when the straps are not under tension. The elastic properties of the rubber should preferably be such that the stress in the straps calculated on their cross-sectional area under no tension should be in the range of 200 to 400 p.s.i. at maximum elongation.

The five debarking tools 264 are fastened on the infeed ends of the tool shafts 232. These tools are crescent-shaped in elevation when viewed from the infeed side, Figure 9. The plane of the crescents lie in a plane perpendicular to the axis of rotation of the rotor. The debarking portion of each tool consists of a blunt edge 265 at the tip of each tool. This edge extends substantially parallel with the axis of rotation of the rotor. The tool is further so shaped that the edge forms the end of a triangular deflecting surface 266 that follows the convex trailing portion of each tool for some distance from the tip thereof toward the shaft. The outer end of each tool is provided with a machined tongue 267 that fits in the milled slots 236 in the wing-shaped head 235 on the end of the tool shaft 232. Two parallel screw-receiving holes extend through the tongue 267 and the slotted portion of the head 235, the axis of one of the holes extending diametrically through the axis of the tool shaft 232 at the front end of the latter, and the innermost portions of these holes being threaded to receive threaded ends of two screws 268 which secure each tool 264 to its shaft 232.

Along the concave or leading part of the tool 264, the concavity having a radius of curvature roughly equal to one-half the radial distance between the tip 265 and the axis of the shaft 232, there is a sharp edge 269 that is somewhat protruding in the direction facing an oncoming log. In a direction extending parallel to the axis of the rotor, the tool is made very thin in order to present the smallest possible cross section to the flow of bark. The radial distance from the tip of the tool to its pivot axis is roughly ⅔ of the diameter of the opening in the rotor. This opening also determines the maximum diameter of a log that can be debarked. The angular distance traveled by the tool shaft when the tip of the tool moves from its innermost position to its outermost position is almost, or approximately, 45°. In spite of this substantial angle of turn, it is possible to accommodate five tools on the rotor. A prolongation of the path of travel of each tool tip 265 passes near or through the axis of rotation of the hollow head of the rotor. When each tool 264 swings outwardly, its trailing edge does not reach the head 235 of the next adjacent tool, so that the tip of the tool can move freely even on the biggest logs. Thus, in fulfilling this important condition, a maximum of five tools can be accommodated on the rotor. By employing an actuating force that considerably increases as the tool arm swings outwardly through a turning angle of 45° and by utilizing a light-weight, but sturdy, tool, the ratio between the actuating force and the inertia of the pivoting system for any given position of the tool arm, is raised considerably over what has been known before, with the result that the tip of the tool is capable of very fast acceleration in order to follow or accommodate irregularities in log and bark contour. Further, without impairing good debarking action, the rotational speed of the rotor can be raised to a surprisingly high value. For instance, a rotor dimensioned for debarking 14″ maximum-diameter logs can accomplish excellent debarking results even at a rotational speed of 500 revolutions per minute, which corresponds to a linear speed of the tool tip of over 30 feet per second over the surface of a log of maximum diameter. A machine constructed for debarking 26″ maximum-diameter logs can operate efficiently at a speed of 250 revolutions per minute. Such high rotational speeds render possible a high linear-feed rate under almost any condition. The effectiveness of the machine is so high that even frozen wood can be fed at a high rate of speed which can fall in the range of 100 to 200 feet per minute.

The rotor operates as follows:

When a log is fed against the tools by the feed works on the infeed side, the protruding sharp edges 269 on the tools engage the butt end of the log. When this happens there are three possibilities: (1) the tools can break, (2) the sharp edge 269 of one or more of the revolving tools merely scrapes over the end face of the log so that the log is stopped by such tool, and (3) the sharp edges of all of the revolving tools indent the butt end of the log so that all of the tools are swung outwardly by the resultant reaction until the tips of the tools reach the peripheral surface of the log. In spite of the fact that the tool arms are almost perpendicular to the axis of rotation of the hollow head they function as mentioned under (3) above, that is, the tools open automatically in less than $\frac{1}{10}$ of a second, even when the maximum-size log is fed to an empty rotor with butt end first.

The elastic force transmitted to the blunt edge is regulated by adjusting the tension of the straps to fall within a range where the blunt edge 265 penetrates the bark but not the wood surface. Due to the high linear speed of the tool tip over the surface of the wood, this range or latitude is comparatively larger so that considerable differences in barking conditions may occur without impairing a good debarking action. For example, it is possible to pass different kinds of wood such as pine, birch, spruce, even mixed logs of these different kinds, through the rotor without it being necessary to change the setting or tension of the rubber straps. The high linear speed of the tool tips also makes it possible to employ comparatively sharp edges, resulting in an almost complete removal of inner bark and cambium without scraping the wood. Thus, the radius of curvature on the blunt edge has even been brought down to a size of $\frac{1}{48}$ of an inch in a debarking operation intended to remove bast remaining on wood that has been floated. Generally, fine debarking is effected with a tool tip having a radius of curvature between $\frac{1}{24}$ and $\frac{1}{12}$ of an inch.

The width of the blunt edge is also of importance. Generally it should be kept rather narrow to provide proper debarking around knots and concavities. The blunt edge should have a width between $\frac{1}{10}$ and $\frac{1}{20}$ the maximum log diameter, and the width preferably should fall within a range of ⅝" to 2", the ⅝" width being for a machine designed for 8" maximum-diameter logs that are frozen, and the 2" width for a machine designed to work on 26" maximum-diameter logs that have been floated.

The direction of the triangular deflecting surface is such that it is almost perpendicular to the surface of the smallest log, which means that a prolongation of this deflecting surface when the tool is in its innermost position passes near or through the axis of rotation of the rotor. When the tool tip is riding on a cylindrical log of maximum diameter for which the machine is intended, the angle between the deflecting surface and a plane tangential to the wood surface where the tip touches the wood will be about 65°. That part of the deflecting surface close to the blunt edge 265 will produce a tangential force on the bark upon relative rotation of the rotor and the log, such tangential force being large enough to cause a rupture in the cambium zone due to a resulting shear stress. The debarking action of the tool can be termed "shear barking."

A less complicated way to describe the action of the tool is to say that the blunt edge 265 removes the bark by a scraping action. Due to the magnitude of the angle between the portion of the deflecting surface close to the blunt edge and a plane tangential to the wood surface, which angle is approximately 60° to 90°, the tangential forces exerted by the tool on the edge thickness of the bark have only a small reactive component acting to lift the tool tips. When the tool tip is in its innermost position the direction in which the rubber straps exert their forces is roughly perpendicular to a line between the center of the tool shaft and the center of the pin around which the rubber straps are laid. When the tool tip moves outwardly the tension of the rubber straps increases, but the effect of the increase is offset to the extent the effective lever-arm length, that is, the perpendicular distance from the tool shaft to the center line of action of the rubber bands, decreases. By varying the number of rubber bands 242 and the quality and elongation characteristics thereof, the centripetal torque exerted by the rubber bands on the tool shafts, which torque increases as the tools move to their outermost positions and stretch the rubber bands, can be made to compensate for a simultaneous increase in centrifugal torque caused by such repositioning of the tools; and thus it becomes possible to obtain any desired torque characteristic, for example, one in which the tool pressure is the same on a small log as on a large log. Due to the fact that the linear speed of a blunt edge over a wood surface, and hence the centrifugal force exerted on the tool is directly proportional to the radius of the log on which the tip slides, it is preferable to provide a torque characteristic that, after such centrifugal force has been deducted, provides a 25 to 50% rise in the net centripetal force exerted by each tool tip. Large forces exerted axially and radially on the tool shaft result in minimum friction and wear because of the afore-described carefully sealed roller bearings. The distance from the longitudinal axis of the pin on the lever 238 to the axis of the tool shaft 232 is roughly ⅓ of the radial distance between the axis of the tool shaft and the tip 265 of the tool. In a machine having the characteristics above described, the amount of rubber in the strips should be such that its cross section for each tool should lie in the range of 1.5 to 6 square inches per inch of the width of the blunt edge, that is, the extent of the blunt edge axially of the machine.

On the side of the rotor 209 that faces an oncoming log there are provided a number of fan blades or vanes 270, one for each tool. In a preferred arrangement these blades each comprise a strip of spring steel. This strip is provided with a loop through which is passed a hold-down bushing 271 secured by a screw 272 to the infeed face of the rotor 209. The strip is bent around the protruding portion of the bushing 233 that is on the infeed side of the rotor, as shown in Figures 9 and 10, the strip then extending in a radial direction to terminate in the neighborhood of the inner ring 140 that closes the inner periphery of that part of the annular frame that constitutes the bark-collecting and ejecting hood. Since the vanes or blades 270 are of spring steel they are resilient and yield if, for example, a large chunk of wood or a piece of metal—if a tool breaks—becomes engaged between a fan blade and the sharp corner of the ejection spout. The space in the hollow frame in which the debarking tools rotate has a diameter that is approximately the same as the outside diameter of the tool-carrying-head assembly. The infeed side of the bark-collecting and -removing space is closed by a sheet-metal ring 273, the opening in the center of which can be somewhat larger than the opening in the rotor 209, if desired, so that the largest log for which the machine is intended can readily be accommodated. The outside diameter of the sheet-metal ring 273 is larger than the inside diameter of the ring 108, and is somewhat larger than what could be accommodated between the collars 105 that surround the thick-walled tubes 110, 112 and 114. The outer periphery of the sheet metal ring 273 is cut away at three places to provide three concave cutouts spaced 120° from one another, so that the ring can be fit over the protruding portions of the collars 105. At such portions of the collars 105, notches 275 are cut into the contacting surfaces of the collars and the ring 108. The gap of these slots is somewhat smaller than the thickness of the ring 273. To one side of each of the three cutouts the material of the ring is relieved so as to provide a wedge commencing at one edge of the cutout and extending some distance along the periphery of the ring. When the ring has been fit over the protruding portions of the collars and is turned, the wedge-forming portions slide into the slots 275 until the ring is tightened in place. The direction in which the metal ring 273 is turned to engage the slots is the same direction in which the rotor rotates. With this arrangement the friction of the bark on the inside face of the cover ring 273 has a tendency to tighten rather than loosen the ring. At the inner periphery of the cover ring the metal is bent forwardly, as shown in Figure 10, in order to make the cover ring more rigid and to better collect bark.

Due to the high linear speed of the debarking tools over the surface of the wood, and particularly since the tools are continuously maintained in contact with the wood surface, most types of bark are immediately torn to small pieces and thrown into the bark-collecting space in a direction that is substantially tangential to the wood surface. The bark-collecting space, as stated, is formed by the inner periphery of the ring of the sheet-metal strip sructure 140 of the annular frame, the infeed face of the rotor, and the cover plate 273. The bark between the fan blades 270 is thrown out of the collecting space and through the tangential outlet as the fan blades sweep across the outlet. Where the upper side 139 of the tangential ejection spout meets the hood formed by the strip member 140 there is mounted a replaceable steel cutter 276, Figure 4. This cutter is so dimensioned that there is a small clearance between it and the fan blades, and cooperates therewith in cutting larger chunks of bark. With some types of bark, however, the rotational speed is not high enough to prevent the formation of long slivers of bark. Some of these slivers become caught on the con-concave edge of the debarking tool and impair the action thereof by adding so much weight to the same that the debarking pressure at the tips of the tool is radically decreased due to centrifugal forces exerted by the slivers of bark. To avoid difficulties of this character to a considerable degree, and as disclosed in prior application Serial No. 517,832, filed June 24, 1955, one or more countersteels or knife-forming members can be mounted on the interior of the sheet-metal ring 273. Such knife-forming member is of rectangular section and made from a sturdy steel rod. It is mounted to extend in an approximate radial direction relative to the axis of the rotor and extends from a point close to the inner periphery of the opening in the cover ring a distance sufficient to form a sturdy counterknife but not so long as to be in the path of the vanes which, as shown, are wider at their tips than at their bases. The dimensions of the counterknife are such that a comparatively small clearance space exists between it and the infeed face of the debarking tools, that is, the plane perpendicular to the axis of the rotor which contains the protruding sharp edges of the debarking tools. This clearance space should be less than ½″ and preferably about ⅛″. When the tools are working on a medium-sized log a portion of the sharp edge of each tool will pass the countersteel. If there is a bark sliver on this portion of the concave sharp edge it will be cut or torn off between the countersteel and the sharp edge of the tool. Thus, the sharp edge of the tool has two completely different tasks: (1) it engages the butt end of a log being fed to automatically open and place the tool tip on the surface of the bark of the fed log against the continuously operating resilient torque applied to the tool shaft, and (2) to cut bark slivers, either by moving at a high linear speed, across the ends of logs of such end diameter that the butt end forces bark slivers that are hanging around the tools to be pressed against the concave edge of the tool with such pressure that the slivers are cut immediately, as during the automatic opening of the tools, or by cooperation with a fixed counterknife, as described.

When tools are working continuously on logs, the diameters of which are small relative to the maximum-size log for which the machine is intended, a considerable amount of slivers can accumulate around the concave edge without their coming within the sphere of operation of the fixed counterknife. Therefore, it is advantageous to provide a movable counterknife that extends close to the surface of the log being debarked, independently of its diameter. As disclosed in our application, Serial No. 621,788, filed November 13, 1956, the basic concept of this arrangement is that the log being debarked governs the position of the movable counterknife. Such a counterknife is preferably pivoted about a point near the inner periphery of the sheet-mteal strip means 140 that forms the bark-collecting hood, and the knife swings in a path perpendicular to the axis of rotation of the hollow head and close to the plane containing the sharp concave edges of the tools. The movable counterknife is attached to a short shaft that extends parallel to the axis of rotation and is journaled in a tube extending through the detachable sheet-metal ring 273 that encloses the bark-collecting space. The pivotal motion and length of this tool is such that it can pass from near the axis of rotation of the head until it swings beyond the hole in the closure ring 273. The direction of the counterknife or tool is such that its free end points in the same direction as the rotational movement of the rotor. With this arrangement there is little risk of damage should a debarking tool engage the movable counterknife. This engagement would produce a force that causes the counterknife to move outwardly.

The position of a movable or pivoted counterknife can be automatically governed by the position of the three linked-together feed rolls mounted on the infeed side of the machine. These rolls, the structure and operation of which are described in our above-mentioned Patent Number 2,857,945, are pivoted about axes parallel to the axis of the rotor and the degree of pivotal motion is a function of the cross section of the log engaged by the rolls. A lever can be attached to the front end of the shaft on which the pivoted countersteel is journaled and linked by a wire to a lever on the hub of one of the pivotal feed-roll arms, in an arrangement such that the pivoted countersteel is always a short distance outside the periphery of a log on which the feed rolls are working. In operation, when a big log is followed by a smaller log or no log at all, so that the feed rolls move toward the axis of the rotor, the wire becomes slack and the countersteel falls inwardly on the surface of the big log for that short period of time, generally less than ½ a second, required for the end of the big log to travel a distance from its point of engagement with the three feed rolls past the debarking tools. Alternatively, a rigid link can be utilized instead of a wire, this link incorporating a longitudinal spring and telescopic means to take care of situations when a large log is followed by a smaller log. When a smaller log is followed by a larger log, the countersteel is lifted away from the surface of the smaller log for that short period of time required for the end of such a small log to travel from just after it loses contact with the feed rolls until it passes between the debarking tools. In instances where the bark is such that long slivers thereof seldom occur, the arrangement can be such that the pivoted countersteel can be operated by a hand lever. In such instances the normal position of the countersteel would be outside the path of the largest log for which the machine is intended.

The details of construction of elements 300 through 357 (see Figures 1, 2, 3 and 15) of the feed works and the means for applying force to the feed rolls are completely disclosed in our prior application Serial No. 573,279, filed March 22, 1956, now Patent No. 2,857,945, granted October 28, 1958.

The particular tools disclosed in this application include the tool means of Figure 15, in which a tool 264′ includes a metal body having a flange 267′ bent laterally from one end thereof. This flange 267′ fits in a slot machined in the head 235′ of the tool-carrying shaft. To the side of the metal body from which the flange projects is welded a triangle-shaped deflecting piece 266′. As shown in Figure 15, the face of the metal body opposite the flange has a protruding portion terminating in a sharp edge 269′ that renders the tool self-opening.

The tool of Figures 12 to 14 can be cast from an abrasive-resistant cast iron, or can be formed by forging. In any event, the deflecting surface 266 is integral with the crescent-shaped body portion of the tool.

Another feature of the tool shown in Figures 12 to 14 resides in the fact that the flange 267, which fits in the slot machined in the wing-shaped head on the tool-carrying shaft, extends along the crescent shaped body so that, in effect, it is substantially perpendicular to the tool tip. By contrast, the flange on the back side of the crescent-shaped body of the tool shown in Figure 17 extends perpendicular to a line connecting the tool tip or outer end of the crescent with the axis about which the tool-carrying shaft pivots. The arrangement of Figures 12 to 14 permits the tool to be of lighter construction without sacrificing strength.

Figure 15 additionally illustrates a single tube-shaped elastomer spring 356 for each of the feed work mechanisms.

In the embodiment illustrated in Figures 16 to 18, the log to be debarked is fed forward while restrained against rotation by roller mechanisms including rollers 2 and 3 arranged on both sides of the debarking mechanism. The debarking mechanism includes a hollow rotor or ring 4 suitably journaled on an annular ring of ball bearings for rotation relative to a stator 5. The rotor includes a sheave-forming portion 6 over which are mounted V-belts 7. The supporting structure and the drive for the V-belts is not shown. On the rotor 4 are arranged a plurality of debarking tools 8. These tools have arms 19 which are crescent-shaped in elevation to provide concave sharp edges 20 as set forth in the parent application, and have flanges 23 which are attached to shafts 9 that extend parallel to the axis of rotation of the rotor or ring 4. The mechanism for applying elastic force to the tools is illustrated in Figure 18, and is of the type more fully described and claimed in our prior application Serial No. 417,814, filed March 22, 1954, now Patent No. 2,786,499, granted March 26, 1957, and entitled "Debarker Having Pivotal Bark-Removing Tools Biased by Elastic Rubber." Thus, the actuating force for the tool is effected by an elastic band means 10 trained over an adjustably mounted abutment 10′ and a further abutment 11′ projecting laterally of the face of a lever 11. The lever 11 includes a tubular portion splined to the shaft 9 so that when a tip of the tool arm is moved away from the axis of the ring the lever 11 is turned clockwise in Figure 18 to stretch the band means 10. Thus, the elastic band means applies an elastic force to each tool arm to urge the ends of the same toward the axis of rotation of the ring 4. Each of the shafts 9 passes through and is journaled by bearings in a housing 12 that is mounted on that side of the rotor structure which faces an oncoming log. Wings or fan blades 13 are also secured to the housings 12 and the entire assembly of stator, rotor, tools, force applying means, and wings or blades are surrounded by a hood 14 having a bark-discharging outlet 14′. The hood 14 has an opening 16 therein on the infeed side which is circular and has a diameter somewhat larger than the diameter of the largest log which the machine is designed to debark.

The crescent-shaped tool arm 19 substantially contains a plane which lies at right angles to the axis of rotation of the rotor and each arm 19 has its widest end deformed laterally to provide the mounting flange 23. The flange 23 is provided with bolt receiving apertures 24 (see Figure 19) and fits in a groove formed in a headed component 25 formed on the end of shaft 9. Suitable bolts pass through apertures provided in the head 25 and through the apertures 24 in the flange 23 to securely mount each tool on the shaft 9. This mounting insures an arrangement in which the mounting means at no point protrudes beyond the forwardmost surface of the tool arm 19.

In Figure 19 the debarking edge of the tool is denoted at 18 and the edge-supporting portion is shown at 17. Simplified and light-weight tool construction is effected by forming the tool from a plate which is cut to shape and then bent at right angles to form the flange 23 and the edge-supporting portion 17.

Preferably, the debarking tools 8 are so arranged that the arms 19 substantially contain a plane extending at right angles to the axis of rotation of the rotor or ring 4. However, if desired, the crescent-shaped arms can be bent somewhat backwards as indicated by an arm 19′ in Figure 5.

It is believed clear that the present invention provides a compact rotary ring debarking mechanism which includes a plurality of tool members each comprising a relatively thin arm of crescent shape supported for swinging movement toward and away from the axis of the rotor and having a bark-removing tip extending parallel to the axis of rotation from an outfeed planar side of the arm.

In the foregoing description we have set forth the essentialities of the present invention and as indicated, the crescent-shaped tool body incorporates three major components:

(*a*) the crescent-shaped body portion having the sharp concave edge, (*b*) the tip structure which includes the bark-engaging tip and deflecting web and (*c*) the mounting flange that projects from the trailing face of the body portion at the end opposite the tip.

As pointed out previously, the tool for any given size debarking machine such as one designed to constitute what is known as a 14″ machine, that is, the maximum-size logs that can be debarked approximate that diameter, can be varied in certain relationships. If the tool is associated with the head structure on the tool-supporting shaft such as 9 in Figures 16 through 20, wherein the mounting flange extends perpendicular to a line connecting the tool tip with the center of turning of its supporting shaft, the tool can be constructed to have the form shown in Figures 21 to 38.

In addition, it is to be pointed out that for a given-size machine, the flange-receiving slot formed in the head on the end of the respective tool-supporting shafts is milled to have a particular dimension, thus as an example, in the 14″ machine this slot has a transverse dimension to accommodate what can be referred to as 10 mm. metal. Consequently, the problem of providing a tool with proper strength for longevity purposes and a proper ratio of size and weight requires consideration. Effective tools can be constructed in various ways. For example, the tool in Figures 21 to 26 is formed of sheet metal. The crescent-shaped body portion 500 is formed of 8 mm. metal, the bark-deflecting web 501 being welded to the trailing face of the body portion along the convex edge as shown, and the mounting flange 502 is formed of 10 mm. metal bent at right angles, ground down at the portion that is a continuation of the body portion to be approximately the same thickness and welded at 503 to said body portion. The flange is drilled to accommodate the securing bolts or screws that fasten it to the slotted head structure. The body portion 500 is further shaped to have the concave face deflected out of the plane of the body portion so as to be able to be ground down to form the sharpened edge 504, which renders the tool self-opening.

In order to eliminate during manufacture the necessity of welding the deflecting web and mounting flange to the body portion, the tool can be constructed as shown in Figures 27 to 33, in which it is pressed in one piece from 10 mm. metal, so that the body portion 505 is integral with the deflecting web 506 and the mounting flange 507. The various sections through the body portion illustrating the sharpened edge 508 as being ground off at an angle of 15° from a curved plan extending perpendicularly to the plane of the body portion and the bark-deflecting web being at different angles to the first-mentioned plane in contradistinction to the relationship of Figures 24 and 26 where this web extends perpendicularly to the main plane of the crescent-shaped body portion. This angular relationship further facilities bark removal with the extreme tip end 509 of the web 506 being approximately perpendicular to the main plane of the body portion as appearing in Figures 27 and 33. A "Stellite" tip structure is embodied on the tip end of the tool.

As another desired alternative, the tool can be fashioned as shown in Figures 34 to 38. This tool being essentially similar to that of Figures 27 to 33 except that it is formed of 8 mm. metal and the mounting flange 507' is indented or corrugated from opposite faces as at 510 and 511 so that the series of corrugations increase the thickness of the mounting flange, so that it can be readily machined to 10 mm. thickness on those faces that fit within the slot on the head structure. This relationship provides a tool, therefore, that is lighter than that shown in Figures 27 and 28 for the same-size machine.

As a further and desirable modification, it has been found that the weight of the tool and the dimensions thereof in the directions transverse to the rotor axis can be further reduced without impairing the life expectancy of the tool, and providing a tool of a lower-inertia effect as regards the pivoting system of the tool-supporting shafts.

One form of this further modified tool is shown in Figures 9, and 12 to 14. The essential change in the tool structure compared with the relationship shown in Figure 17 is illustrated in Figure 9, wherein it is seen that the mounting flange 267 is disposed in the slot in the head structure on the end of shaft 232 so as to extend at an acute angle to a line that connects the center of shaft 232 with the tip of the tool. Thus, the mounting flange 267 is reoriented in relation to the crescent-shaped body portion to be at an angle of between 30° to 40° from the position shown in Figure 17. Thus, a substantial portion of metal is eliminated and the inertia effect is approximately one-third less than that resulting from the Figure 17 relationship. In addition, it has been established that the dimensions of the crescent-shaped body portion of the tool 264 in the direction transverse to the rotor axis can be substantially reduced, so that when all the tools are in their innermost position there is more free space within the rotor. This is clear from a comparison of Figures 9 and 17. Consequently, when the machine is in operation there is more room for bark to escape. The tool in Figures 39 to 48 corresponds to that in Figure 9, and has a bark-deflecting web 514 welded to the body portion to extend approximately perpendicular to the main plane of the body portion at the convex side thereof and the concave side of the body portion being deflected laterally out of that main plane so that a sharpened edge 515 can be effectively produced. If desired, and as shown as at 516 in Figure 46, a cutting surface of hardened metal such as "Stellite" can be embodied with this concave edge.

To eliminate the necessity of welding the bark-deflecting web, the tool can be constructed as shown in Figures 49 to 54 in which a body portion 517 is integral with a bark-deflecting web 518, the latter being at varying angles to the plane of the body portion similar to the relationship in Figures 30 to 33, even though the innermost end of this web is approximately perpendicular to the plane of the body portion. A mounting flange 512 is also integral with the body portion and has the same gauge thereof such as a thickness of 10 mm. Of course the same tool can be made of metal of 8 mm. thickness and the flange corrugated as shown in Figure 34, so that the weight of the tool is reduced.

In order to further reduce the weight of the tool, the same can be constructed to have the form as shown in Figures 55 to 66, wherein a mounting flange 519, deflecting web 520 and body portion 521 are not only integral but homogeneous, this tool being drop-forged. The flange 519 extending at an angle of approximately 32½° to a line perpendicular to another line that connects the tip 522 to the center of turning of the associated shaft. When the tool is drop-forged, the concave edge is formed with what can be termed as an arrowhead shape, and this concave and sharpened edge is extended approximately to the level of the flange, the metal of the body portion adjacent the flange being deflected outwards of the main part of the body portion which throughout a substantial extent of the body portion is not planar. In other words, as shown in Figures 61 to 65 the crescent-shaped body portion has varying transverse dimensions so that in an intermediate portion between section lines 62 and 64, it is of bulged or what might be termed an airfoil cross section. The tip 522 of the bark-deflecting web, where it engages the log, extends parallel to the axis of the rotor, and the arrowhead-shaped, sharpened concave edge lies in approximately the same plane throughout the extent of this edge, whereas the opposite convex edge of the body portion from the side of the tip opposite the log-contacting surface up to the flange lies at different angles to the plane containing the sharpened edge. This convex surface of the body portion 521 is also rounded. Figure 66 illustrates a "stellite" tip provided on the end of the tool. Therefore, the tool just described has a bark-deflecting web structure that extends a substantial distance inwards from the tip, and furthermore, the tool while crescent-shaped in elevation, does not have what can be termed planar front and rear faces. The mounting flange is made of the desired thickness in accordance with the thickness of the slot to accommodate the same. A drop-forged tool of the structure just described for a 14" machine weighs approximately 6 kg. whereas, the tool of the type shown in Figure 17 weighs approximately 1 kg.

It is clear, therefore, that the present invention provides several forms of tool-mounting relationship, all having the common characteristic of the cooperation between the mounting flange projecting from the trailing face of the tool and fastened in an axially extending slot in a head structure on an end of a tool-supporting shaft. The flange can be of different thickness than the body portion, can be of a separate piece of metal welded to the body portion, can have the same thickness as the body portion where it is of sheet metal and when a tool is drop-forged the flange will have the dimensions desired to fit within the slot. Further, the flange and slot can extend in a direction perpendicular to a line connecting the center of the associated shaft with the tip of the tool or the flange and slot can extend at an acute angle to that line.

What is claimed is:

1. A debarking machine of the type wherein logs while restrained against rotation are fed axially to and through the machine, comprising a rigid, hollow annular frame, a stator supported within the frame intermediate the infeed and outfeed side thereof, a tool-carrying rotor journaled within the stator, infeed and out-feed mechanisms supported on the infeed and outfeed sides of the frame, each mechanism including a plurality of feed rolls, means mounting the rolls for movement toward and away from the axis of the rotor including means for applying the rolls to the periphery of a log to center the same relative to the rotor, driven components housed within the hollow frame, one of said driven components imparting rotation to said rotor and the other of said driven components including drive elements for imparting rotation to the rolls and the rotor, said rotor carrying a plurality of tool-supporting shafts mounted for pivotal movement about axes parallel to the axis of the rotor, each shaft having a head projecting from the infeed face of the rotor, each head having an axially extending slot in its free end, a tool for each shaft comprising a body portion crescent-shaped in elevation and having leading and trailing faces relative to the direction of log feed, a combined blunt tip and bark-deflecting web provided on one end of said body portion, said web projecting from the trailing face of said body portion and extending from the tip toward an intermediate part of said crescent-shaped body portion, said web having an axial extent greater than the thickness of the intermediate part of the body portion, a mounting flange provided on an opposite end of the body portion, said flange projecting from the trailing face of the body portion and being positioned within said slot, and means fastening said flange to said head so as to mount the tool on its shaft.

2. In a debarking machine of the type wherein logs while restrained against rotation are fed axially to and through the machine, a stator, an annular tool-carrying rotor journaled within the stator, a plurality of tool-supporting shafts mounted on the rotor for pivotal movement about axes parallel to the axis of the rotor, each shaft having a head projecting from the infeed face of the rotor, each head having an axially extending slot in its free end, a tool for each shaft comprising a body portion crescent-shaped in elevation and having leading and trailing faces relative to the direction of log feed, a combined blunt tip and bark-deflecting web provided on one end of said body portion, said web projecting from the trailing face of said body portion and extending from the tip toward an intermediate part of said crescent-shaped body portion, said web having an axial extent greater than the thickness of the intermediate part of the body portion, a mounting flange provided on the opposite end of the body portion, said flange projecting from the trailing face of the body portion and being positioned within said slot, means fastening said flange to said head so as to mount the tool on its shaft, and means for swinging the shafts about their axes to swing the tools inwardly to move the tips toward the axis of the rotor to effect debarking.

3. In a debarking machine of the rotary-ring type, a rotor, a plurality of tool-supporting shafts pivotally mounted in the rotor and extending parallel to the axis thereof, each shaft having an end projecting from one face of the rotor, a head structure on each said end having an axially extending slot therein, a tool member for each shaft comprising a body portion crescent-shaped in elevation and terminating in a bark-removing tip, said crescent-shaped body portion having leading and trailing faces relative to the direction from which logs are fed to the machine, said body portion further being thinner in the direction parallel to the rotor axis than in the direction transverse thereto, said tool member having a mounting flange at one end of the body portion, said mounting flange projecting from the trailing face of said body portion and positioned in the slot in said head structure, and means fastening said mounting flange to said head structure.

4. In a debarking machain as claimed in claim 3 and each said flange and slot extending in a direction forming an acute angle to a line that extends between the axis of the respective shaft and the tip of the associated tool member.

5. In a debarking machine as claimed in claim 3 and each said cooperating flange and slot extending substantially perpendicular to a line that extends from the center of the associated shaft to the tip of the tool member.

6. In a debarking machine as claimed in claim 3 and a bark-deflecting web on the trailing face of each tool member extending from the tip toward the flange along the convex edge of the tool member.

7. In a debarking machine as claimed in claim 3 and said flange and body portion being a homogeneous one-piece structure.

8. In a debarking machine as claimed in claim 7 and said body portion having an integral sharpened edge on the concave side of its crescent-shape, said body portion having a varying cross-sectional shape from the tip toward the flange to define a bark-deflecting web at the tip extending substantially perpendicular to the plane of the crescent.

9. In a debarking machine as claimed in claim 3 and said flange having corrugations therein so that the opposed faces of the flange have portions of a transverse dimension in excess of that portion of the body portion adjacent the flange.

References Cited in the file of this patent

UNITED STATES PATENTS

| | | |
|---|---|---|
| 2,692,623 | Leffler | Oct. 26, 1954 |
| 2,774,397 | Leffler | Dec. 18, 1956 |
| 2,786,499 | Brundell et al. | Mar. 26, 1957 |
| 2,787,304 | Brundell et al. | Apr. 2, 1957 |